US007430570B1

(12) United States Patent
Srinivasan et al.

(10) Patent No.: US 7,430,570 B1

(45) Date of Patent: Sep. 30, 2008

(54) SHADOW DIRECTORY STRUCTURE IN A DISTRIBUTED SEGMENTED FILE SYSTEM

(75) Inventors: Sudhir Srinivasan, Chelmsford, MA (US); Boris Zuckerman, Marblehead, MA (US)

(73) Assignee: Ibrix, Inc., Billerica, MA (US)

( * ) Notice: Subject to any disclaimer, the term of this patent is extended or adjusted under 35 U.S.C. 154(b) by 428 days.

(21) Appl. No.: 10/833,924

(22) Filed: Apr. 28, 2004

Related U.S. Application Data

(60) Provisional application No. 60/465,894, filed on Apr. 28, 2003.

(51) Int. Cl.
*G06F 12/00* (2006.01)

(52) U.S. Cl. .......................................... 707/204; 714/2

(58) Field of Classification Search ....................... None
See application file for complete search history.

(56) References Cited

U.S. PATENT DOCUMENTS 5,721,916 A * 2/1998 Pardikar ..................... 707/201
6,782,389 B1 8/2004 Chrin et al.
7,103,915 B2 9/2006 Redlich et al.
2003/0097454 A1* 5/2003 Yamakawa et al. .......... 709/229
2003/0126265 A1 7/2003 Aziz et al.
2004/0088376 A1 5/2004 McCanne et al.

* cited by examiner

*Primary Examiner*—Michael Le
(74) *Attorney, Agent, or Firm*—Townsend and Townsend and Crew LLP

(57) ABSTRACT

Techniques are provided for producing a shadow directory structure for files or directories owned by servers whose parent directories are owned by different servers in a single distributed file system. For each file or directory whose parent directory resides on a remote server, the server owning the file or directory produces a shadow directory structure. The shadow structure may be used in a variety of ways, e.g., to access an orphan when the server owning the orphan's parent directory is offline (e.g., down, failed, or otherwise inaccessible), or to perform a partial file system consistency check (a partial fsck) to verify consistency of segments of the file system.

28 Claims, 14 Drawing Sheets

| SEGMENT # TO FILE SERVER (e.g., IP) ADDRESS MAP | | |
|---|---|---|
| SEGMENT NUMBER RANGE | MASK | (PARTIAL) SERVER LOCATION |
| SEGMENT NUMBER RANGE | MASK | (PARTIAL) SERVER LOCATION |
| ... | ... | ... |
| SEGMENT # | MASK | (PARTIAL) SERVER LOCATION |
| SEGMENT # | MASK | (PARTIAL) SERVER LOCATION |

410 — (header row area)
412 — SEGMENT NUMBER RANGE
414 — MASK
416 — (PARTIAL) SERVER LOCATION
420 — (lower section)
422 — SEGMENT #
235'

SHADOW DIRECTORY STRUCTURE IN A DISTRIBUTED SEGMENTED FILE SYSTEM

CROSS-REFERENCE TO RELATED ACTIONS

This application claims the benefit of U.S. Provisional Application Ser. No. 60/465,894 filed Apr. 28, 2003.

FIELD OF THE INVENTION

The invention relates to computer storage and file systems and more specifically to techniques for accessing files or directories when a server in a distributed storage system is offline.

BACKGROUND OF THE INVENTION

Data generated by, and used by, computers are often stored in file systems. File system designs have evolved over approximately the last two decades from server-centric models (that can be thought of as local file systems) to storage-centric models (that can be thought of as networked file systems).

Stand-alone personal computers exemplify a server-centric model—storage has resided on the personal computer itself, initially using hard disk storage, and more recently, optical storage. As local area networks ("LANs") became popular, networked computers could store and share data on a so-called file server on the LAN. Storage associated with a given file server is commonly referred to as server attached storage ("SAS"). Storage could be increased by adding disk space to a file server. SASs are expandable internally and there is no transparent data sharing between file servers. Further, with SASs throughput is governed by the speed of a fixed number of busses internal to the file server. Accordingly, SASs also exemplify a server-centric model.

As networks have become more common, and as network speed and reliability increased, network attached storage ("NAS") has become popular. NASs are easy to install and each NAS, individually, is relatively easy to maintain. In a NAS, a file system on the server is accessible from a client via a network file system protocol like NFS or CIFS.

Network file systems like NFS and CIFS are layered protocols that allow a client to request a particular file from a pre-designated server. The client's operating system translates a file access request to the NFS or DFS format and forwards it to the server. The server processes the request and in turn translates it to a local file system call that accesses the information on magnetic disks or other storage media. Using this technology, a file system can expand to the limits of an NAS machine. Typically no more than a few NAS units and no more than a few file systems are administered and maintained. In this regard, NASs can be thought of as a server-centric file system model.

Storage area networks (SANs) (and clustered file systems) exemplify a storage-centric file system model. SANs provide a simple technology for managing a cluster or group of disk-storage units, effectively pooling such units. SANs use a front-end system, that can be a NAS or a traditional server. SANs are (i) easy to expand, (ii) permit centralized management and administration of the pool of disk storage units, and (iii) allow the pool of disk storage units to be shared among a set of front-end server systems. Moreover, SANs enable various data protection/availability functions such as multi-unit mirroring with failover for example. SANs, however, are expensive and while they permit space to be shared among front-end server systems, they do not permit multiple SANs environments to use the same file system. Thus, although SANs pool storage, they basically behave as a server-centric file system. That is, a SAN behaves like a fancy (e.g., with advanced data protection and availability functions) disk drive on a system. Also, various incompatible versions of SANs have emerged.

SUMMARY OF THE INVENTION

Embodiments of the invention provide techniques for producing a shadow tree for files or directories owned by given servers whose parent directories are owned by different servers. For each orphan file or directory, i.e., one whose parent directory resides on (is owned/controlled by) a remote server, the server owning the file or directory produces a shadow tree. The shadow tree may take any of various forms, e.g., a deterministic two-level tree indicating a file system object shadow and its associated segment, or a tree indicating each parent directory from the particular orphan file or directory to the tree directory, or a tree chain to the first directory in a chain, from the orphan to the root directory, residing on the same server as the orphan. The shadow tree may be used in a variety of ways, e.g., to access an orphan when the server owning the orphan's parent directory is offline (e.g., down, failed, or otherwise inaccessible), or to perform a partial file system consistency check (a partial fsck) to verify file system consistency. Other embodiments are within the scope and spirit of the invention.

Embodiments of the invention may provide one or more of the following capabilities. A file system object that resides on an accessible file system segment can be accessed even though the object's directory chain includes a directory on an inaccessible file system segment. Shadow tree directories can be established without shadowing entire directory chains from a file system object to the root directory and/or without replicating the directory chain on all servers of the file system. Shadow tree directories can be kept loosely consistent across segments, increasing the scalability of the system. File system consistency checks and other maintenance operations such as upgrades can be performed on file system segments, that are portions of the file system that are less than the entire system, without freezing other segments of the file system. Such operations can also be performed concurrently on multiple segments of the file system, increasing the overall speed of execution.

DETAILED DESCRIPTION OF PREFERRED EMBODIMENTS

Figure 1:
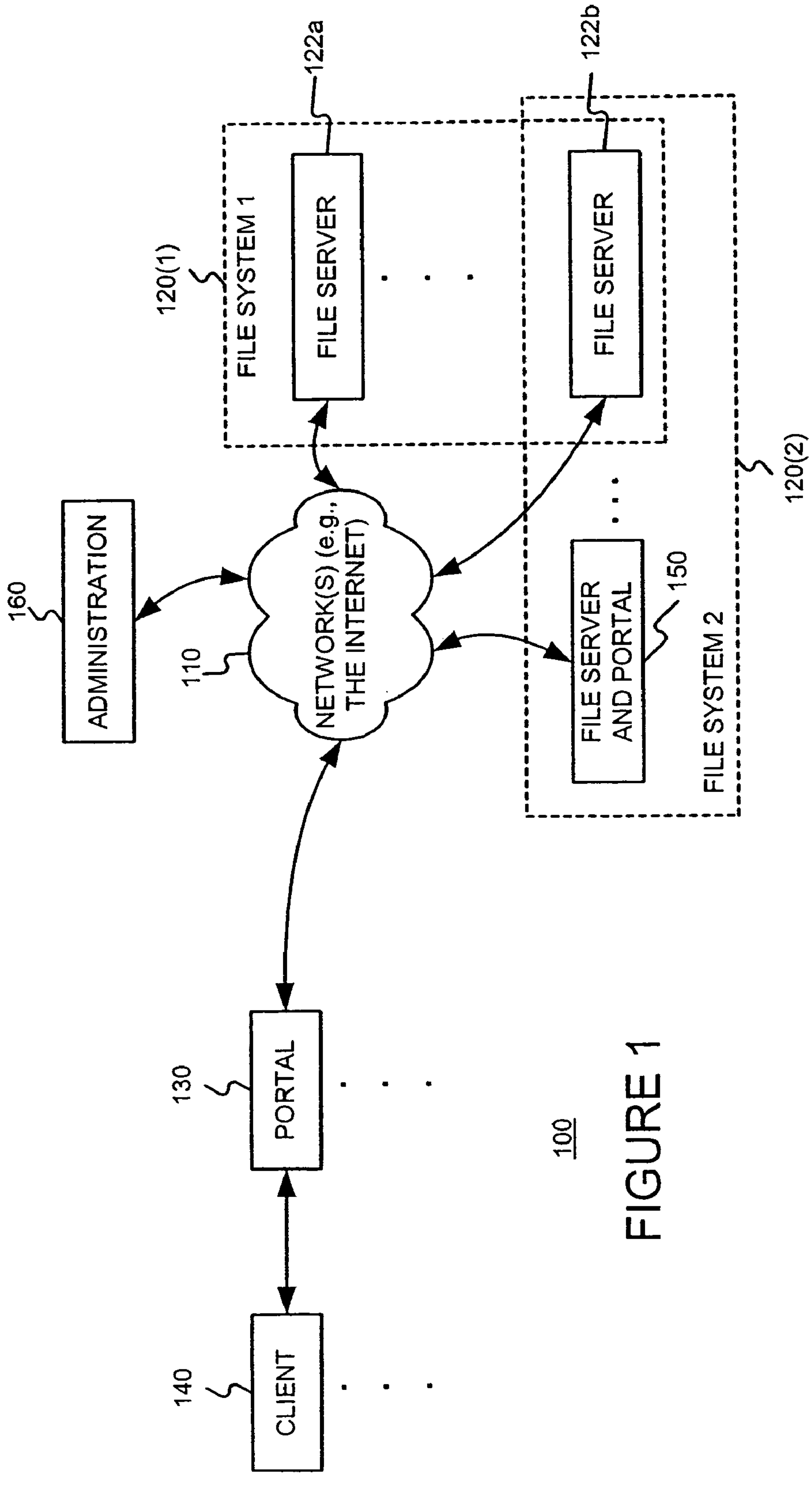
FIG. 1 is a block diagram of a data storage and access system.

FIG. 1 is a block diagram of an exemplary environment 100 in which embodiments of the invention may be used. The exemplary environment 100 includes one or more clients 140, one or more portals 130, a network 110, an administration unit 160, and two file systems 120(1), 120(2). The network 110 may be, e.g., an Internet protocol ("IP") based network. The file systems 120(1), 120(2) include multiple file servers 122, 150, with the file server 150 being a combined file server and portal unit. As illustrated, a single file server **122*b* may belong to/support more than one file system. The one or more portal units 130 permit the one or more clients 140 to use the file systems 120. The clients 140 may or may not be provided with special front-end software or application. From the perspective of the client(s) 140, the file systems 120(1), 120(2) are a virtual single storage device residing on the portal(s) 130. The administration unit 160 is configured to control the file servers 122 and portals 130, and combination 150, and is centralized. Administrative information may be collected from the units 122, 130, 150 and distributed to such units 122, 130, 150 in a point-to-point or hierarchical manner by the administrator 160. Devices used in the environment 100** can be computing devices including processors and software code such that the processors can execute the code to perform functions as described. The devices include other hardware such as busses and communications interfaces as appropriate.

Figure 2:
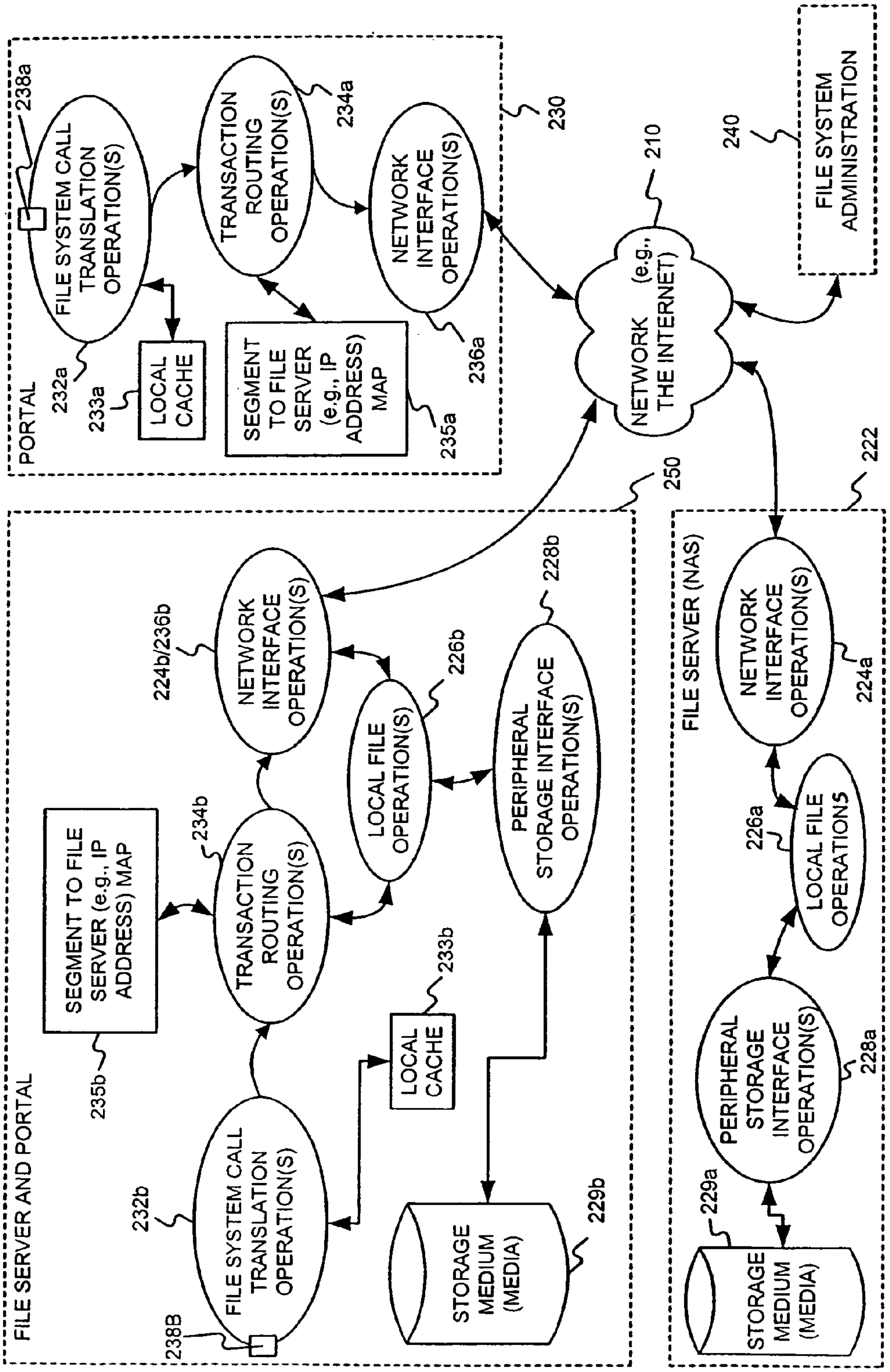
FIG. 2 is a process bubble diagram of operations that may be carried out by various exemplary apparatus used in the system shown in FIG. 1.

Referring to FIG. 2, a file server and portal combination 250, a portal 230, and a filer server 222 are configured to perform the operations shown. Each of these units 250, 230, 222 may be coupled to a network 210 that facilitates communications among the units 250, 230, 222. More than one network may be used even though only the network 210 is shown. A file system administration unit 240 is also coupled to the network 210. The administration unit 240 is configured to gather information about the components 250, 230, 222, and to disseminate system control information (e.g., supporting portal functions) to the components 250, 230, 222 through the network 210.

The file server 222 is configured to perform file access, storage, and network access operations as indicated by various operations modules. The file server 222 can perform local file operations **226*a* including reading and writing files, inserting and deleting directory entries, locking, etc. As part of the local file operations 226*a*, the server 222 can translate given requests into input/output ("I/O") requests that are submitted to a peripheral storage interface operations 228*a* module. The peripheral storage interface operations 228*a* process the I/O requests to a local storage sub-system 229*a*. The storage sub-system 229*a* can be used to store data such as files. The peripheral storage interface operations 228*a* is configured to provide data transfer capability, error recovery and status updates. The peripheral storage interface operations 228*a* may involve various types of protocols for communication with the storage sub-system 229*a*, such as a network protocol. File operation requests access the local file operations 226*a*, and responses to such requests are provided to the network 210, via a network interface operations module 224*a*. The modules shown in FIG. 2** may be separate entities, or may be combined, e.g., as part of a set of computer-readable, computer-executable program instructions.

The portal 230 includes various modules for translating calls, routing, and relating file system segments and servers. A client (user) can access the portal 230 via an access point **238*a* in a file system call translation operations module 232*a*. One way for this entry is through a system call, which will typically be operating-system specific and file-system related. The file system call translation operations 232*a* can convert a file system request to one or more atomic file operations, where an atomic file operation accesses or modifies a file system object. Such atomic file operations may be expressed as commands contained in a transaction object. If the system call includes a file identifier (e.g., an Inode number), the file system call translation operations 232*a* may determine a physical part of a storage medium of the file system corresponding to the transaction (e.g., a segment number) from a (globally/file-system wide) unique file identifier (e.g., Inode number). The file system call translation operations 232*a* may include a single stage or multiple stages. This translation operations 232*a* may also contain local cache 233*a*. This local cache 233*a* preferably includes a local data cache, a cache of file locks and other information that may be frequently used by a client, or by a program servicing a client. If a request cannot be satisfied using local cache 233*a*, the file system translation operations 232*a* may forward the transaction object containing atomic file operation commands to the transaction routing operations 234*a*. Similar functionality is provided in, and similar operations may be performed by, the combined portal and file server 250**.

The transaction routing operations **234*a*, 234*b* use the file identifier to determine the location (e.g., the IP address) of a file server 222/250 that is in charge of the uniquely identified file/directory. This file server can be local (i.e., for the unit 250 acting as both a portal and a file server, that received the request) or remote. If this file server is local, the transaction routing operations 234*b* pass the file operation to the local file operations 226*b* that, in turn, pass an appropriate command to the peripheral storage interface operations 228*b* for accessing the storage medium 229*b*. If, on the other hand, the file server is remote, the network 210 is used to communicate this operation. The routing operations 234 may use the file identifier to derive a corresponding segment number to determine the location of the file/directory. The system is preferably independent of any particular networking hardware, protocols or software. Networking requests are handed over to a network interface operations 224*b*, 236*b***.

The network interface operations 224/236 service networking requests regardless of the underlying hardware or protocol, and forward the transaction toward the appropriate file server 222, 250 (i.e., that controls a particular file system segment associated with the request). The network interface operations 224/236 may provide data transfer, error recovery and status updates on the network 210.

Figure 3:
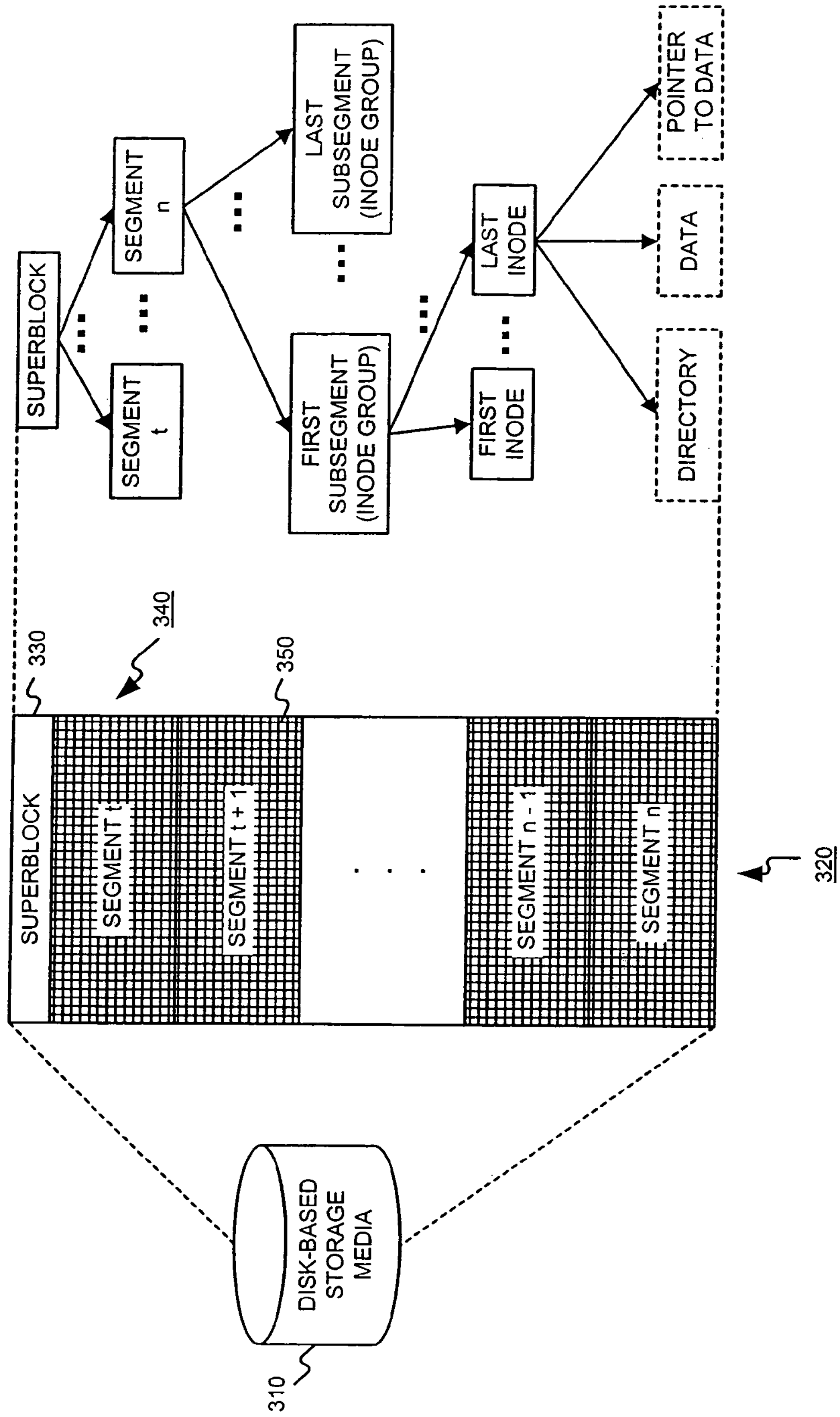
FIG. 3 is a block diagram of an exemplary data structure of a storage medium, such as a disk-based storage medium.

Referring to FIG. 3, a virtual storage 310 is provided that stores file system data. The storage 310 is a logical volume of storage and as shown may be a disk-based storage, although this is not required. A logical volume manager (LVM) aggregates the storage.

The virtual storage 310 uses storage system segments 340 for storing data. The segment 340 is a logical portion of storage (e.g., of a disk or other storage medium). Segments preferably have a predetermined maximum size (e.g., 64 gigabytes "GB") and a target size (e.g., 4 GB) that may be configurable. If the target segment size is 4 GB and the maximum is 64 GB, then for a typical single disk drive with a capacity of 50 GB, the disk would contain between one and a dozen segments. The actual sizes of segments can vary from storage medium to storage medium.

To determine what each disk (or other storage medium) contains, a superblock 330 is included at a fixed address. This superblock 330 contains a map of the segments 340 residing on this disk. Such a map may list the blocks 350 where the segments start. The superblock 330 may also associate the file system with the segments that belong to the file system. The superblock 330 may be duplicated for fault-tolerance either on the same disk or a different one.

In the file system, a file or Inode stored on a disk may be addressed by (i) a segment number, and (ii) a block number within the segment. The translation of this address to a physical disk address occurs at (or by) the lowest level, by the peripheral storage interface operations (e.g., thread) 228 of the appropriate file server 222/250.

Within a file system, each (globally) unique file identifier ("FID") (e.g., an Inode number, a file control block (FCB) in a Windows® operating system, etc.) is associated with a single controlling segment, though each segment can have more than one associated FID. The FIDs can be associated with their segments in a simple fixed manner. For example, each segment has a fixed number of storage portions with which FIDs numbers may be associated.

For example, for a maximum segment size of 64 GB, the fixed number of FIDs per segment may be 8,388,608 (this number comes from dividing the 64 GB maximum segment size by an average file size of 8 KB). In this example, the segment number can be used to determine the actual ranges of FIDs controlled by a segment in the file system. For example, the first segment (number 0) of a file system would have FIDs 0 through 8,388,607. The second segment would have FIDs 8,388,608 through 16,777,215, and so on. The root FID (directory) of a file system is assigned the number 1 by convention (FID 0 is not used) and resides on the first segment. The foregoing numbers represent the maximum ranges of FIDs that a given segment may control—the actual numbers of FIDs that have been allocated may be much smaller.

An Inode may have essentially the same properties as that of a traditional file system Inode. A number uniquely identifies the Inode, which in an exemplary embodiment is a 64-bit quantity. The Inode may contain key information about a file or directory such as type, length, access and modification times, length, location on disk, owner, permissions, link-count, etc. It may also contain additional information specific to the particular file system.

On a storage medium, Inodes may be maintained in Inode blocks (or groups). The Inode blocks themselves may be quite simple, e.g., including a bitmap showing which Inodes in the block are free, a count of free Inodes, and an array of Inodes themselves, as many as fit in the block.

Each segment of the file system is responsible for a fixed set of Inode numbers. This principle is repeated within the segment—that is, segments may be of varying size, and are made up of some multiple of the smallest file system unit, namely a sub-segment. Within the segment, each sub-segment is again responsible for a fixed subset of the Inodes in the segment.

Essentially each operation that can be performed on a file system is associated with some single (globally) unique FID. Continuing the example from above, to determine where a file is stored, and hence where an operation is to be performed, the Inode number is divided by the constant 8,388,608 to yield the segment number. If the result of the division is not a whole number, it is truncated to the next lower whole number. For example, if the Inode number divided by the constant is 1.983, then the segment number is 1.

Figure 4:
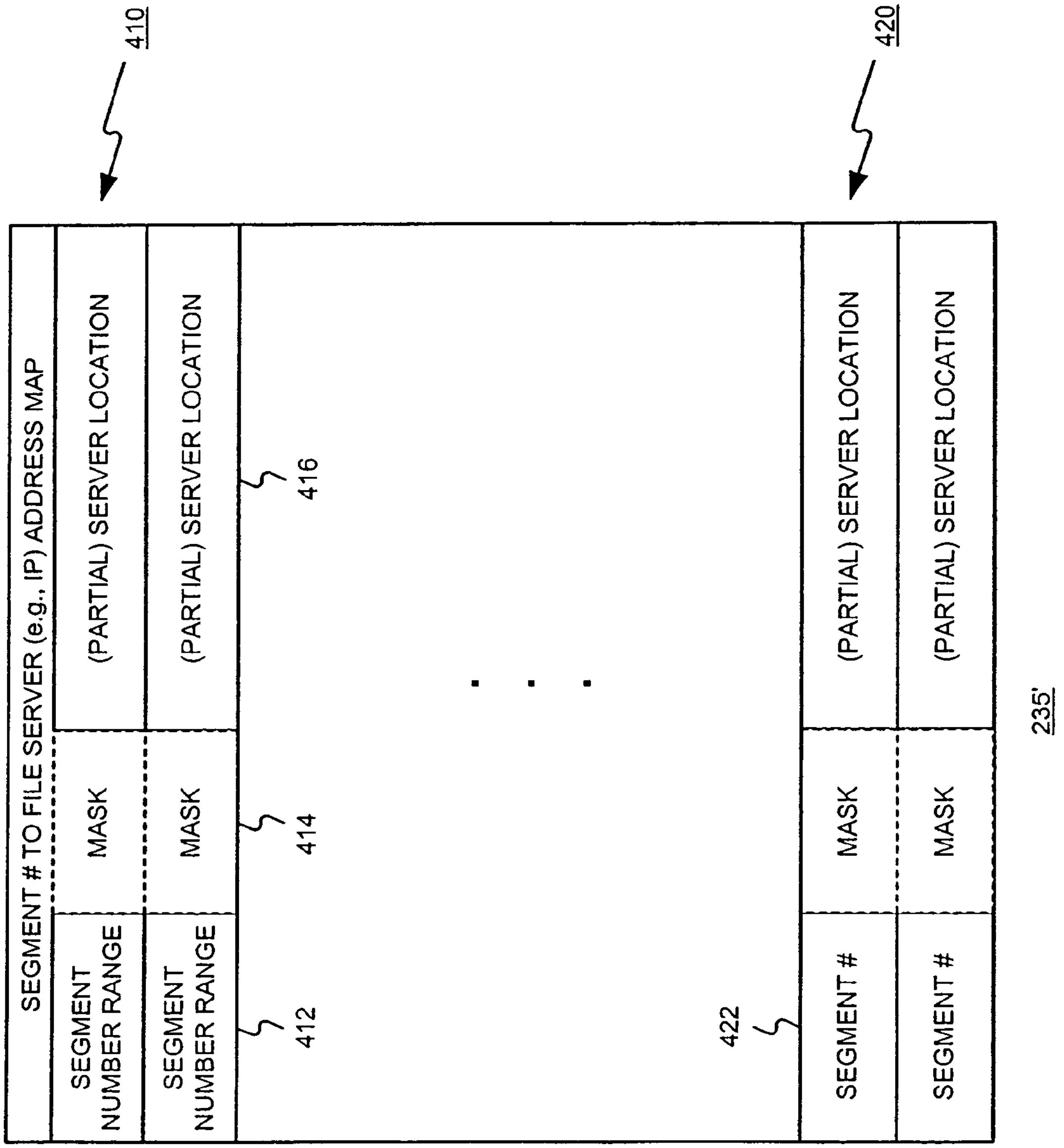
FIG. 4 is a block diagram of an exemplary table data structure that may be used to map segment numbers to identifiers of file servers storing the segments.

This convention also makes it simple to distribute the file system over multiple servers as well using a map of which segments of the file system reside on which host file server. More specifically, once the segment number is derived from the FID, the appropriate file server can be determined by mapping, such as through a routing table. For example, this map may be a table that lists the file servers (on which the local agents execute) corresponding to particular segments. The file server may be identified by its IP address. Referring to FIG. 4, the segment to file server map **235*a* includes segment number ranges 412, segment numbers 422, masks 414, and (partial) server locations 416. The map 235*a* indicates that if a segment number (or a part thereof not masked out by a mask 414) matches one of the stored segment numbers 422, or falls within one of the ranges 412 of segment numbers, then the appropriate file server location, or partial file server location, 416 can be determined. Such a table may be manually or automatically populated (e.g., using file system administration 240 shown in FIG. 2**) in a variety of ways. For example, associations of segment numbers and file servers (addresses) can be manually tracked, and provisioned manually, by some global administrative authority.

File servers may be organized in groups, such as in a hierarchy or some other logical topology, and the lookup of a server may use communication over the network 210 with a group leader or a node in a hierarchy. Such information may be cached on a leased basis with registration for notification on changes to maintain coherency. The local file operations 226 and peripheral storage operations 228 at the determined file server can determine the file to which an operation pertains. Once the request has been satisfied at the determined file server, the result is sent back to the original (portal) server (which may be the same as the determined file server). The original (portal) server may return the result to the requesting client.

Each (globally) unique FID may reside in a segment referred to as the "controlling segment" for that FID. The FID, e.g., an Inode, is associated with a file and encloses information, metadata, about the file (e.g., owner, permissions, length, type, access and modification times, location on disk, link count, etc.), but not the actual data. The data associated with an Inode may reside on another segment (i.e., outside the controlling segment of the Inode). The controlling segment of a particular Inode, however, and the segment(s) containing the data associated with the particular Inode, will be addressable and accessible by the controlling file server. A group of segments that is addressable and accessible by a given file server are referred to as a "maximal segment group". Thus, the Inode and its associated data (e.g., the contents of the file) are contained within a maximal segment group.

At any time, a segment is preferably under the control of at most one local agent (i.e., residing on the local file server). That agent is responsible for carrying out file system operations for any FID controlled by that segment. The controlling segment's unique identifier ("SID") for each FID is computable from the FID by the translator using information available locally (e.g., in the superblock 330). The controlling SID may, for example, be computed via integer division of the FID by a system constant, which implies a fixed maximum number of files controlled per segment. Other techniques/algorithms may be used.

Data from a file may be contained in a segment in the maximal segment group that is not under the control of the file server responsible for the controlling segment. In this case, adding space to or deleting space from the file in that segment may be coordinated with the file server responsible for it. Preferably no coordination is necessary for simple read accesses to the blocks of the file.

Client (user) entry and access to the file system may thus occur through any unit that has translation and routing operations, and that has access to a segment location map. Such units may be referred to as "portals." The file system preferably has multiple simultaneous access points into the system. A portal unit may not need file system call translator operations 232 if such operations are provided on the client (end user) machines.

Figure 5:
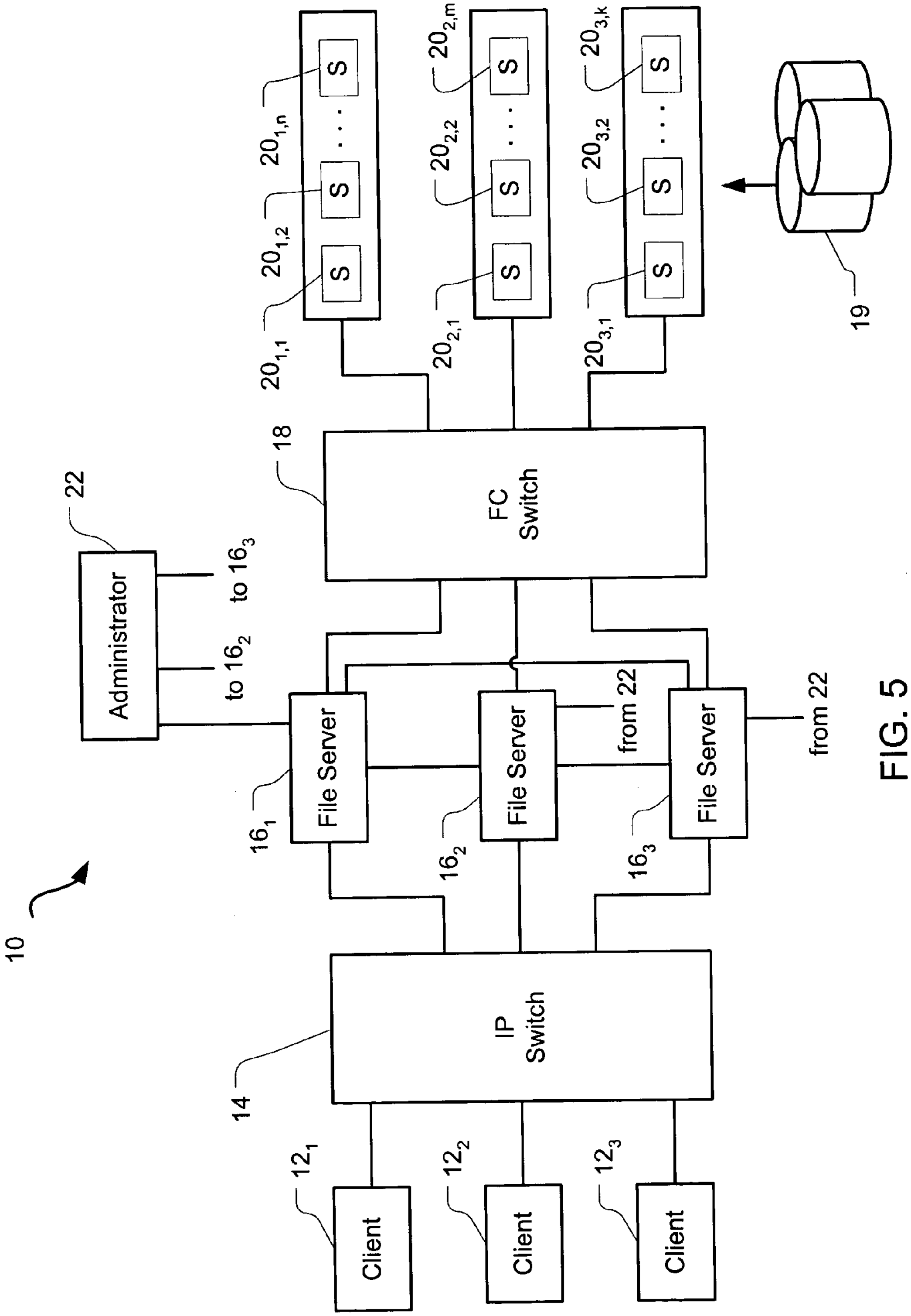
FIG. 5 is a simplified block diagram of a distributed-file system.

Referring to FIG. 5, a data storage and access system 10 comprises clients $\mathbf{12}_1$-$\mathbf{12}_3$, an IP switch 14, file servers $\mathbf{16}_1$-$\mathbf{16}_3$, a fiber channel (FC) switch 18, storage 19, and an administrator 22. Although three clients 12 and three file servers 16 are shown, other numbers of these devices/systems may be used, and the quantities of the items need not be the same. Further, while only one IP switch 14 is shown, more than one IP switch may be used. The storage 19 can be any of a variety of physical media, such as disks, and provides a virtualized file system. As indicated in FIG. 5, the storage 19 stores segments $\mathbf{20}_{m,n}$ that are portions of a file system and that may be stored anywhere physically on the storage 19, but whose data are logically grouped into the segments 20. Segments are typically incomplete portions of the file system in that they may refer to file system entities in other segments. For example, a directory/folder of files in the segment $\mathbf{20}_{1,3}$ can refer to other segments 20, e.g., the segment $\mathbf{20}_{2,1}$ and/or the segment $\mathbf{20}_{3,2}$ with addresses in these other segments $\mathbf{20}_{2,1}$, $\mathbf{20}_{3,2}$ where the corresponding files are stored. A group of the segments 20 is associated with, and controlled by, a corresponding one of the servers 16. For example, the segments $\mathbf{20}_{1,x}$ are associated with and controlled by the server $\mathbf{16}_1$, etc. The servers 16 control the segments 20 in that the servers 16 arbitrate access to the segments 20, in particular modifying metadata including allocating file system blocks, modifying directories, etc. The file servers 16 can be any device or portion of a device that controls segment access. The system 10 provides a distributed file system in that the segments 20 of the file system are dispersed across the storage 19 such that it is not required that the file system be controlled by one server 16 and allows for a plurality of servers 16 to simultaneously control portions of the file system. The clients 12 and the IP switch 14, the IP switch 14 and the file servers 16, the file servers 16 and the FC switch 18, and the FC switch 18 and the storage 19 are configured and coupled for bi-directional communication. Transmission apparatus other than the FC switch 18 would be acceptable, such as an iSCSI device or any of numerous high-speed interconnects available now or in the future. The file servers 16 may also be directly connected to the segments 20. Further, the file servers 16 are configured and coupled for bi-directional communication with each other and with the administrator 22.

Any of the file servers 16 may be general computing devices, such as personal computers, workstations, etc. As such, the file servers 16 can include processors and memories that store software instructions that are executable by the processors for performing described functions. The file servers 16 may have their own local storage instead of or in addition to the storage 19 and can control/manage segments of a file system on their local storage. The file servers 16 may be clustered to work on a common issue and the clustered servers 16 may be managed/regulated in accordance with the invention.

The file servers 16 can assign FIDs and allocate memory for write requests to the segments 20 that the servers 16 control. Each of the servers 16 can pre-allocate an amount of memory for an incoming write request. The amount of pre-allocated memory can be adjusted and is preferably a fixed parameter that is allocated without regard, or even knowledge, of a quantity of data (e.g., a size of a file) to be written. If the pre-allocated memory is used up and more is desired, then the server 16 can pre-allocate another portion of memory. The server 16 that controls the segment 20 to be written to will allocate an FID (e.g., an Inode number). The controlling server 16 can supply/assign the Inode number and the Inode, complete with storage block addresses. If not all of the pre-allocated block addresses are used by the write, then the writing server 16 will notify the controlling server 16 of the unused blocks, and the controlling server 16 can de-allocate the unused blocks and reuse them for future write operations.

The file servers 16 are also configured to produce and store backup paths to files and directories. The servers 16 are configured to produce shadow trees indicative of file or subdirectory ancestry where a file system object, e.g., a file or a subdirectory, is an orphan in that the parent directory of the file system object is located in a segment 20 other than the segment 20 containing the file system object. Shadow trees are preferably produced where a parent directory is located in a different segment 20 because control of the segments 20 may be migrated from one server 16 to another, although shadow trees may be produced only where the parent directory is in a segment 20 controlled by a different server 16. Each file server 16 can determine, e.g., in response to a write request, that an orphan (file system object) is, has been, or will be produced in a segment 20 different from the segment 20 in which its parent directory resides. Each file server 16 can determine and store an ancestry associated with the orphan.

The file servers 16 can determine, produce and store shadow tree ancestries for orphans in a variety of manners. The servers 16 can determine information (including identifiers) about the ancestry of an orphan from a create lookup and store the ancestry. For example, if a write request includes the entire prefix for the orphan, e.g., as in Windows® systems, then the file servers 16 can elicit the prefix from the request and store the prefix. Alternatively, for Unix® systems, a write request does not include the entire prefix, but data exist in the memory of the file servers 16 that the file servers 16 can use to reconstruct the prefix.

Figure 6:
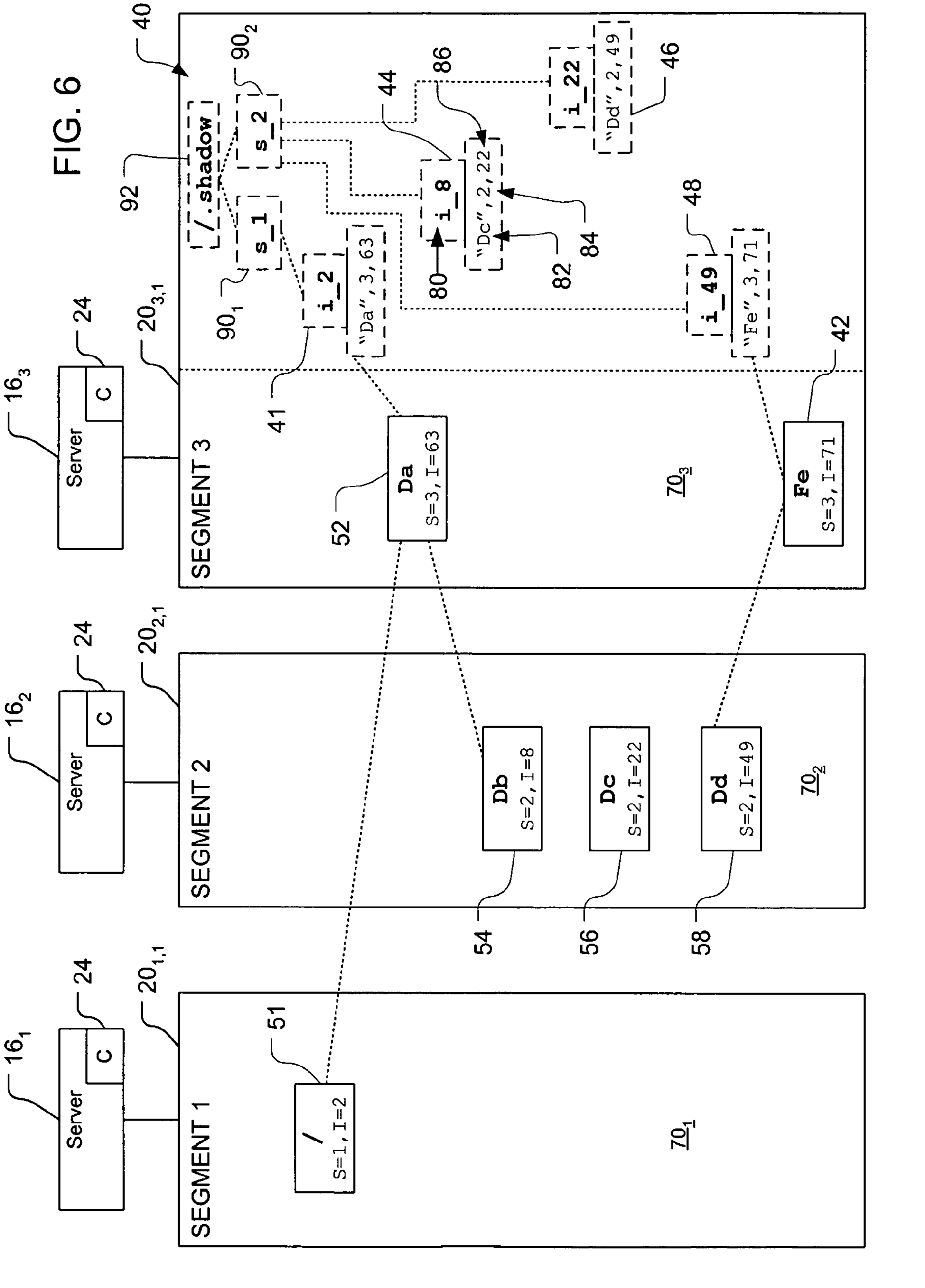
FIG. 6 is a simplified block diagram of three servers and corresponding distributed file system segments showing a shadow tree of one of the segments.
Figure 7:
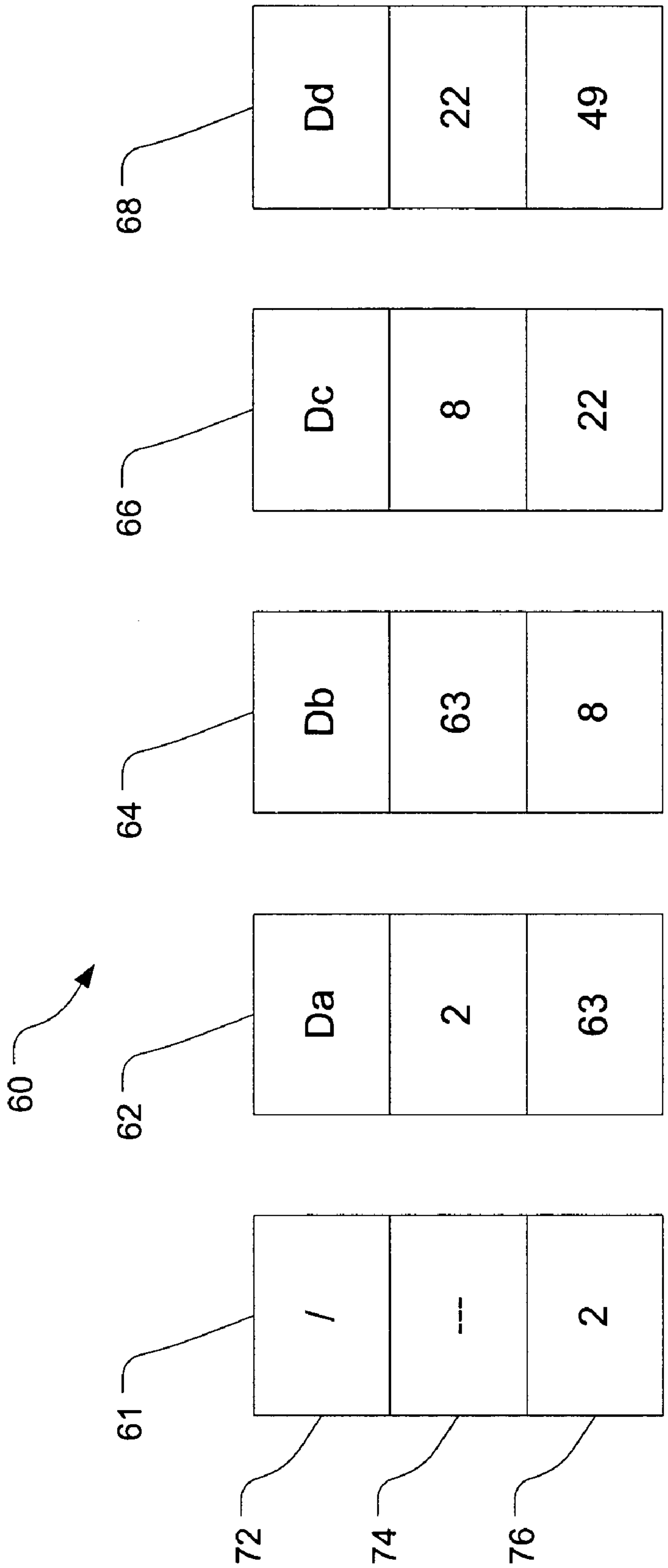
FIG. 7 is a series of D_entries for a write operation indicating a directory ancestry of an object.

Referring also to FIGS. 6-7 an example of a shadow tree 40 for a file 42 is shown for a Unix®-based system as derived from a set 60 of D_entries 61, 62, 64, 66, 68. This shadow shown is exemplary only, and not limiting of the invention, as other techniques and other forms of shadow structures are possible. The set 60 of D_entries 61, 62, 64, 66, 68 is stored in the server $\mathbf{16}_3$ and the shadow 40 derived by the server $\mathbf{16}_3$ is stored in the segment $\mathbf{20}_{3,1}$. For illustrative purposes, the segments 20 involved in this example are segments $\mathbf{20}_1$-$\mathbf{20}_3$ and are controlled by the file servers $\mathbf{16}_1$-$\mathbf{16}_3$ respectively. Objects (files or directories) stored in the segments 20 are in primary name spaces $\mathbf{70}_1$-$\mathbf{70}_3$ of the segments $\mathbf{20}_1$-$\mathbf{20}_3$ while shadow entries are in shadow trees (e.g., the shadow tree 40 of the segment $\mathbf{20}_{3,1}$). The primary name spaces are logically (and possibly, though not necessarily, physically) separate from the shadow trees. Indeed, the shadow entries can be implemented in primary name spaces and artificially hidden. The shadow tree 40 is a logical entity and can be physically implemented in a variety of ways such as by a file system directory tree, a database, a flat text file with a record for each shadow entry, etc. Also, the term "tree" does not require that the tree 40 be of a particular logical form, e.g., a multi-branched entity stemming from a single trunk. For example, the tree 40 could be a single chain of related shadow entries.

The servers 16 are configured to determine the names, Inode numbers, and the segments 20 corresponding to the Inode numbers for directories in the chain of an orphan, and the Inode numbers to which the directories in the chain point. When a write, in this example indicating to write /Da/Db/Dc/Dd/Fe, is initiated in the segment $20_3$ of the file server $16_3$, the memory in the server $16_3$ will store the series 60 of D_entries 61, 62, 64, 66, 68. The D_entries 61, 62, 64, 66, 68 each indicate a directory name 72, a parent directory Inode number 74 (if applicable), and a self Inode number 76 for each directory or subdirectory in the prefix chain of the write indicating to where the file 42 is to be written. As shown, a directory/51 has no parent Inode number 74 and has a self Inode number 76 of 2, a directory Da 52 has a parent Inode number 74 of 2 and a self Inode number 76 of 63, a subdirectory Db 54 has a parent Inode number 74 of 63 and a self Inode number 76 of 8, a subdirectory Dc 56 has a parent Inode number 74 of 8 and a self Inode number 76 of 22, and a subdirectory Dd 52 has a parent Inode number 74 of 22 and a self Inode number 76 of 49. The server $16_3$ can search its memory for, and extract from, the D_entries 61, 62, 64, 66, 68 the names 72 and self Inode numbers 76 of directories in the orphan's directory chain. The server $16_3$ can also determine the segments 20 corresponding to the self Inode numbers 76 (e.g., by applying an algorithm), and can analyze the directory Inodes to determine the Inode numbers to which the directories point.

The servers 16 are configured to use the directory names 72, self Inode numbers 76, and segment numbers, and Inode numbers to which the directories point to produce a shadow tree for orphans in the segments 20 controlled by the respective servers 16. Continuing the example shown in FIGS. 6-7, the server $16_3$ backtracks through the D_entries 61, 62, 64, 66, 68 and uses the information from the D_entries 61, 62, 64, 66, 68 and the Inodes of the directories (e.g., the Inode numbers pointed to in the directories' Inodes) to form the shadow tree 40.

When it is time to create the file system object Fe 42 and the server $16_3$ determines that Fe will be created on segment $20_{3,1}$, a shadow tree structure is created for Fe 42 since its parent directory Dd 58 is on a different segment $20_{2,1}$. Referring to FIG. 7, the server $16_3$ determines from D_entry 68 that the Inode number for Dd 58 is 49. The server $16_3$ creates the shadow tree entry 48 with the name i_49 and records the information for Fe 42 within this entry as having the name "Fe" and the Inode number 71 (the segment number may not be recorded as the segment number can be inferred from the Inode number). The newly created shadow entry 48 is linked to the segment root $90_2$ based on the fact that the entry shadows the directory Dd 58 which resides on Segment 2 $20_{2,1}$ of the file system. Proceeding further, the server $16_3$ determines the Inode number of the parent of the directory Dd 58 from the D_entry 68 to be 22. The server $16_3$ searches its list of D_entries to find one that has Inode number 22 as its third component, in this case D_entry 66. Since Inode number 22 resides on a different segment, here segment $20_{2,1}$, than the segment $20_{3,1}$ that the server $16_3$ has used to store Fe 42, a shadow tree entry 46 is created for Inode 22 in a manner similar to the creation of shadow tree entry 48. This process is repeated to create the shadow tree entry 44. The next determination of the parent directory results in the directory Da 52, which is found to be local to server 163 on segment 203,1, and so no shadow tree entry is created for that the directory Da 52. The server $16_3$ further determines the parent of Da 52 to be the root directory 51 of the file system and creates the shadow tree entry 41 which is linked into the segment root $90_1$ since the root directory 51 of the file system resides on segment 1 $20_{1,1}$ of the file system.

Alternatively, the shadow tree 40 can be formed "on the fly" by storing the desired entry information as a write request is processed, as a create lookup is stepped through. This would follow a procedure similar to the one described above except that in this case the shadow tree entries would be created as individual directories in the path to the file system object Fe 42 are looked up in order starting from the root directory 51 of the file system. As each directory is looked up in succession, if either the directory itself or its parent is on a remote segment 20, a shadow tree entry is created for it using the segment and Inode numbers of the remote directory. For example, the lookup of "/Da" would determine that the parent directory is Inode number 2 in segment number 1 and the target directory Da is inode number 63 on segment number 3 and so a shadow tree entry 41 is created with name "i_2" and containing a record for Da with segment number 3 and Inode number 63 and this shadow tree entry 41 would be linked into segment root $90_1$.

The shadow tree 40 shown in FIG. 6 includes two orphans, the directory 52 and the file 42, and can thus be viewed as two shadow trees, one for the directory 52 and one for the file 42 that includes the directory 52. For discussion purposes, the shadow tree 40 is treated as a shadow tree for the file 42.

To form the shadow tree 40, for each remote directory (i.e., not in the segment 20 of the orphan) in the chain of the file 42 to be written, the server $16_3$ produces a shadow tree entry. Here, the server $16_3$ produces shadow tree entries 41, 44, 46, 48 corresponding to remote directories 51, 54, 56, 58, respectively. The entries 41, 44, 46, 48 are designated by the Inode numbers 80 of the directories to which the entries 41, 44, 46, 48 correspond. The entries 41, 44, 46, 48 further include the name 82, segment number 84, and Inode number 86 of the object (directory or file) in the chain of the particular orphan to which the directory corresponding to the shadow tree entry points. Thus, for example, the entry 44 includes values of the directory Inode number 80, pointed-to directory name 82, pointed-to directory segment number 84, and pointed-to Inode number 86 of i_8, Dc, 2, and 22, respectively.

The server $16_3$ further associates each of the entries 41, 44, 46, 48 with a segment root 90. There is a segment root 90 for each of the segments 20 in the file system for which shadow entries are produced in the tree 40 and except for the segment 20 on which the shadow tree 40 resides. Thus, for illustrative purposes, the shadow tree 40 includes segment roots $90_1$ and $90_2$ corresponding to the segments $20_{1,1}$ and $20_{2,1}$ called segment 1 and segment 2 in FIG. 6, respectively, but no segment root for segment 3 on which the tree 40 resides. The segment roots 90 are in turn associated with a shadow root directory 92, here labeled "/.shadow".

The server $16_3$ stores the shadow tree 40 in the segment 20 of the corresponding orphan, here the file 42. The shadow tree 40 is hidden from view during normal operation. If, however, a server 16 is inaccessible (e.g., goes down, fails, is offline, or is otherwise unavailable), then the shadow tree 40 will be made accessible by the server $16_3$. The shadow tree 40 may be made available even if a segment 20 becomes inaccessible if the server 16 that controls the inaccessible segment 20 is still accessible, e.g., operational and online.

Other configurations of shadow trees are possible and within the scope of the invention. For example, referring to FIG. 8, an orphan, here the file 42, has a shadow entry 32 that includes a path 34 (.path) for the particular file 42. Here the path 34 is /Da/Db/Dc/Dd and includes the associated Inode numbers and segment numbers. This path 34 reflects the sequence of directories through which the file 42 (Fe) can be reached. The entry 32 also includes a pointer to the file Fe. The entry 32 is related to s_2 that corresponds to shadow entries corresponding to segment 2 file system objects. As another example, referring to FIG. 9, orphans, here the file 42 and the directory 52, are linked in a shadow tree 94 to the shadow root 92 through segment roots 90 through shadow entries, here the entries 48, 41, respectively. Shadow paths from the orphans 42, 51 to the shadow roots 92 are of a deterministic length of two links (i.e., the shadow entry 41, 48 and the respective segment entry 90). Non-orphan files or directories are not reflected in this shadow tree 94.

Returning to FIGS. 5-6, the servers 16 can use the shadow trees stored in the segments 20 to access files and directories if a directory in the chain of the file system object to be accessed resides on an inaccessible segment 20. The file system object to be accessed need not be an orphan. If a directory in the chain of a desired object is inaccessible, the server 16 seeking to find the desired object can use the shadow trees of the various segments 20 to locate the desired object as long as the desired object resides in a segment that is accessible. For a Unix®-based system, the servers 16 can use an access request to find first the highest-level directory, e.g., the directory 52. Upon finding the highest level directory, the searching server 16 determines the next-level object in the request, obtains the Inode number of the next-level object from the current-level object, and if the current-level object is a directory, searches the file system for the next-level object that is referenced by the current-level directory. If the next-level object is inaccessible, then the searching server 16 searches the shadow trees of the segments 20 for the next-level object. The server 16 may only search its own shadows (those on the segments 20 that the server 16 controls) or may search shadows controlled by other servers 16 only after failing to find the next-level object in its own shadows, or may search its own shadows and those of other servers 16 in parallel, etc. The shadow trees can be made accessible in a variety of ways, e.g., in response to a global indication that a segment 20 is inaccessible, or in response to an indication from a searching server 16 that a segment 20 is inaccessible, etc. From either the found object, or the found shadow entry corresponding to the object, the searching server 16 can determine a directory or file (name, Inode number, and segment number) to which the found object/entry points. The searching server 16 continues until it finds the desired object, and then the server 16 can access the desired object. Preferably, the searching server 16 searches only the currently-found objects for next-level objects. This can help reduce the search time.

Other techniques can be employed by the searching servers 16 for different shadow tree configurations. For example, for the shadow tree configuration shown in FIG. 8, the searching server 16 can search for the entire path (e.g., in a Windows®-based system) or can search piece by piece using the full paths provided. In the latter form of search, the searching server 16 searches the shadow tree for each next-level object, preferably within only the shadow tree entries satisfying the previous level of search. Thus, the searching server 16 could search first for directory Da, then for a directory Db from among the paths that started with directory Da, and so on. For the shadow tree configuration shown in FIG. 9, the searching server 16 searches shadow trees for references to ancestral directories that are inaccessible. Thus, if segment 1 is inaccessible, the searching server 16 searches the shadow trees for a reference to the inaccessible directory from segment 1. If the desired object is directory 52 and the selected inaccessible directory is directory 51, then the searching server 16 will find the sought-after reference in the shadow entry 41.

The servers 16 are further configured to update their respective shadows if a directory's name changes. If a directory's name is changed, the servers 16 are informed of the change (e.g., through a broadcast to all the servers 16). Alternatively, the servers 16 could proactively determine name changes, e.g., by inquiring of changes on the servers 16 (e.g., in response to a shadow crawler, described below, detecting that a shadow path is invalid, especially one that was previously valid). The servers 16 search their respective shadow trees for the old directory name and if found, replace this name with the new name in the shadow tree.

Referring to FIGS. 5 and 6, the servers 16 each include a shadow crawler 24 that can verify paths in the shadow trees. The crawler 24 is configured to periodically run to step through the corresponding shadows, e.g., those on segments 20 controlled by the corresponding server 16. The crawler 24 analyzes each entry in each shadow tree and verifies that the indicated references are valid. For example, the crawler 24 can verify that referenced children exist on the segment and with the Inode number and name specified by the shadow entry. The crawler 24 can also verify that indicated directories exist on the segment and with the Inode number, name, and pointer specified by the shadow entry and include pointers indicated in the corresponding shadow tree entries. The crawlers 24 can query other servers 16 as appropriate to verify the validity of the shadow tree being verified. Alternatively, fewer crawlers than in each server 16 can be used such as a centralized crawler for all the servers 16. Invalid entries discovered by the crawler are cleaned up (removed).

The administrator 22 is configured to monitor the file servers 16, and collect information from and disseminate information to the file servers 16. The administrator 22 is also configured to allocate ranges of Inode numbers for new segments 20. The administrator 22 can determine when a file server 16 and/or storage (and thus room for new segments 20) is added to or removed from the system 10, determine appropriate new Inode numbers, and provide information to the file servers 16 so that the servers 16 can determine which file server 16 controls a particular segment 20 of the file system. For example, the administrator 22 can provide information to affect how the file servers 16 determine which file server 16 controls the file segment 20 associated with an incoming request. This may include, e.g., providing information to alter a mapping of segments 20 and file servers 16, or information to modify an algorithm used by the file servers 16 to determine the controlling file server 16 from an FID.

Figure 10:
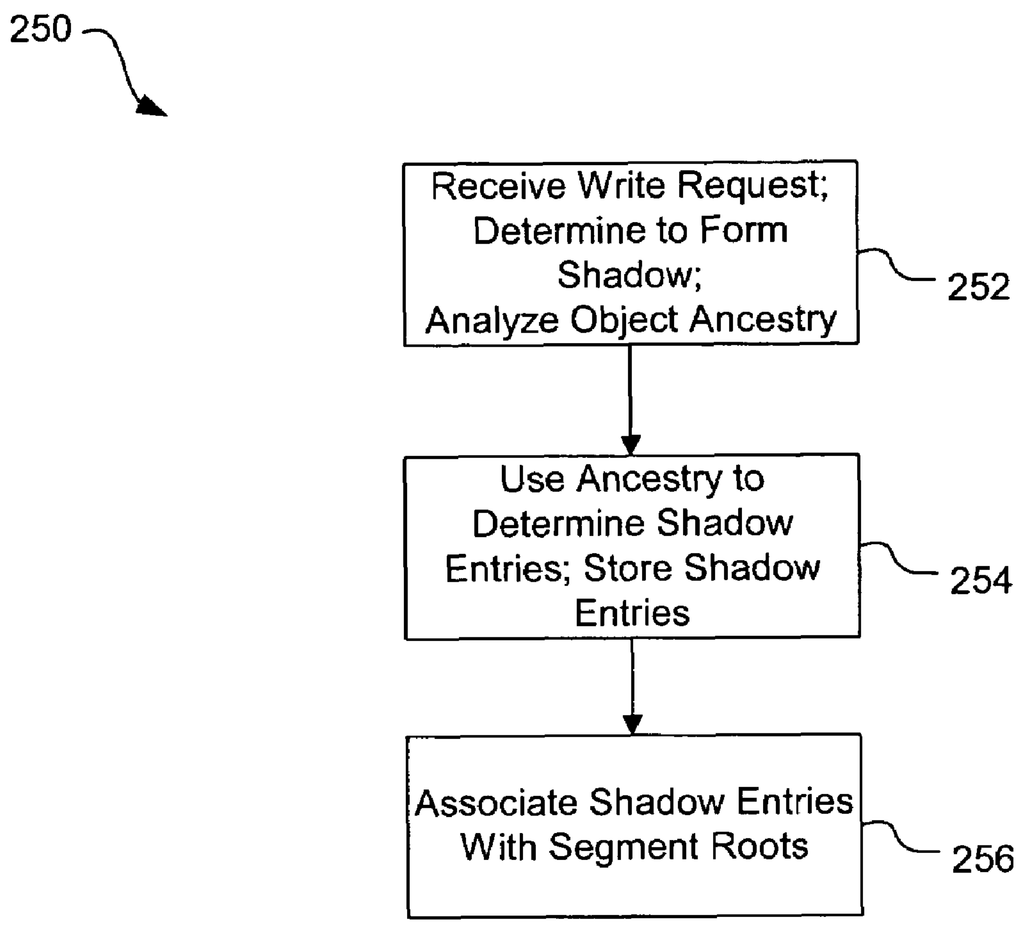
FIG. 10 is a block flow diagram of a process of producing a shadow tree.

In operation, referring to FIG. 10, with further reference to FIGS. 5-7, a process 250 includes the stages shown for producing a shadow tree. The process 250 is exemplary only and not limiting. The process 250 can be altered, e.g., by having stages added, removed, or rearranged. For exemplary purposes, it is assumed that the shadow tree 40 is to be produced. For the process 250, it is assumed that the shadow entry 41 has been previously produced and stored when a write request was processed to write the directory 52.

At stage 252, a write request is received at the server $16_3$ and it is determined to form a shadow tree. The server $16_3$ analyzes the write request and determines that the request is for an orphan, here the orphan file 42 with an ancestry of /Da/Db/Dc/Dd. The server $16_3$ determines the first object in the ancestry of the orphan that is earlier in the ancestry than the orphan and resides on the same segment as the orphan (the "stop object"), here the directory Da 52. The server $16_3$ analyzes the set 60 of D_entries corresponding to the write request to determine the ancestry including the directory names, 72, the parent Inode numbers 74, and the self Inode numbers 76 of the objects between the orphan and the stop object.

At stage 254, the server $16_3$ uses the ancestral information to produce and store shadow tree entries for the objects between the orphan and the stop object in the ancestry of the orphan. The server $16_3$ produces the shadow entries 44, 46, and 48 corresponding to the directories 54, 56, and 58, including the Inode numbers of the directories 54, 56, 58, and the child name 82, segment number 84, and Inode number 86.

At stage 256, the shadow tree entries 44, 46, 48 are associated with appropriate segment roots 90 and the shadow root directory 92. Here, the entries 44, 46, 48 are associated in the shadow tree 40 with the segment root $90_2$ because each of the directories 54, 56, 58 associated with the entries 44, 46, 48 reside on segment 2, i.e., segment $20_{2,1}$. The entry 41 was previously associated with the segment root $90_1$ as the corresponding directory 51 resides on segment 1, i.e., the segment $20_{1,1}$.

Figure 8:
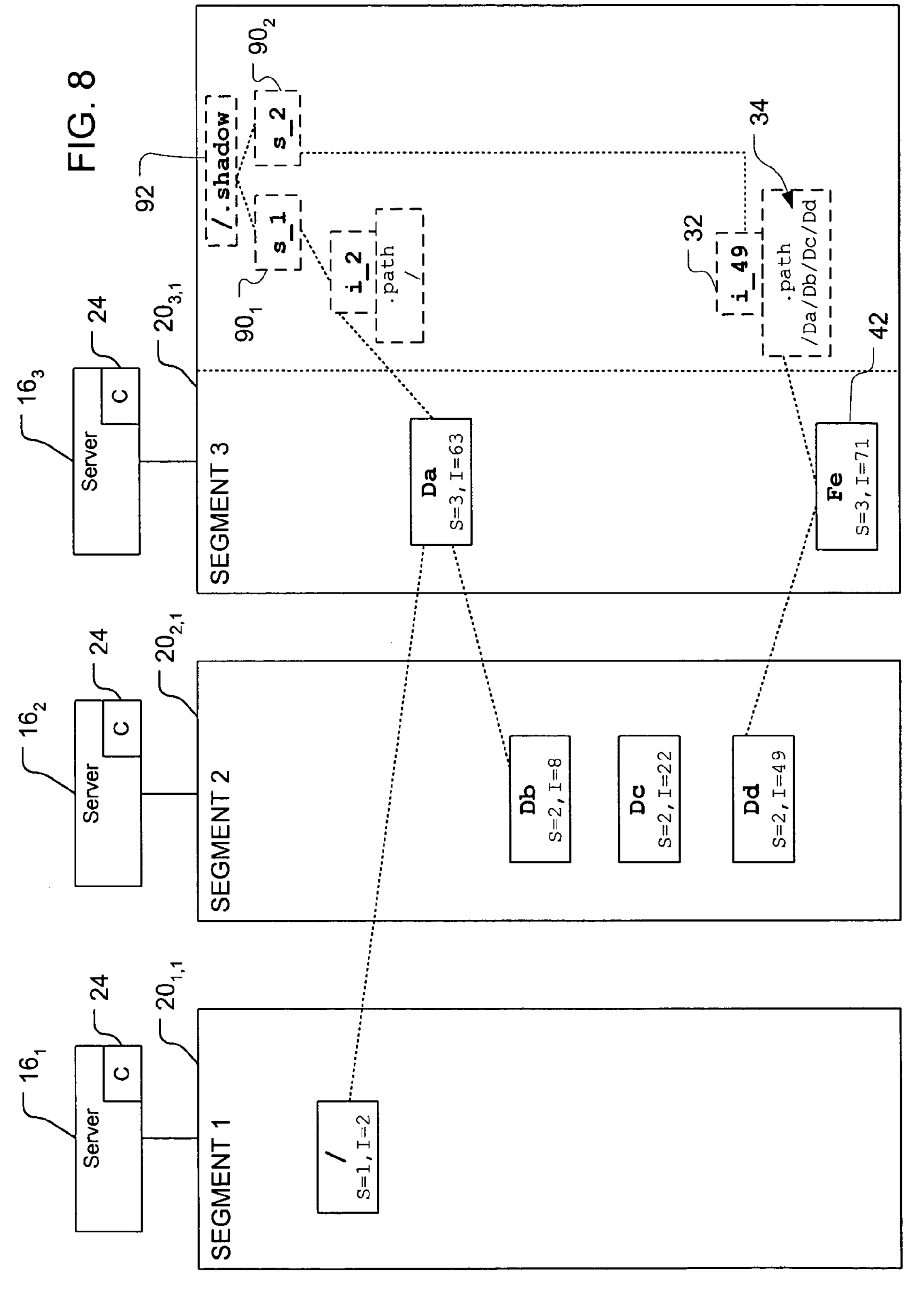
FIGS. 8-9 are simplified block diagrams of three servers and corresponding distributed file system segments showing alternative shadow trees of one of the segments.
Figure 9:
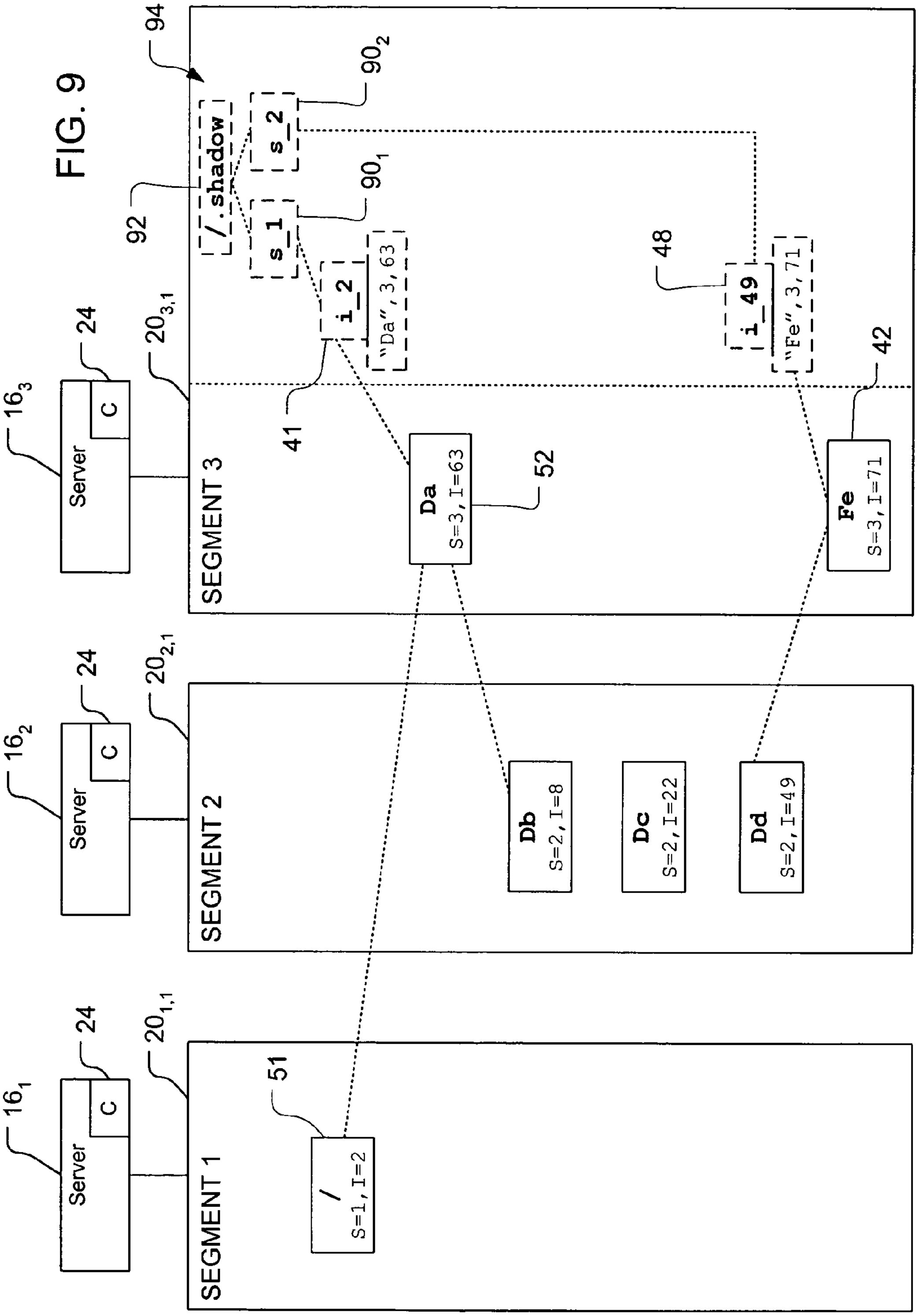

A similar technique can be used to build the trees shown in FIGS. 8 and 9. The format of the tree entries and structure of the trees themselves are different, but the technique discussed above can be used for determining the information to be used for the entries and the tree itself.

Figure 11:
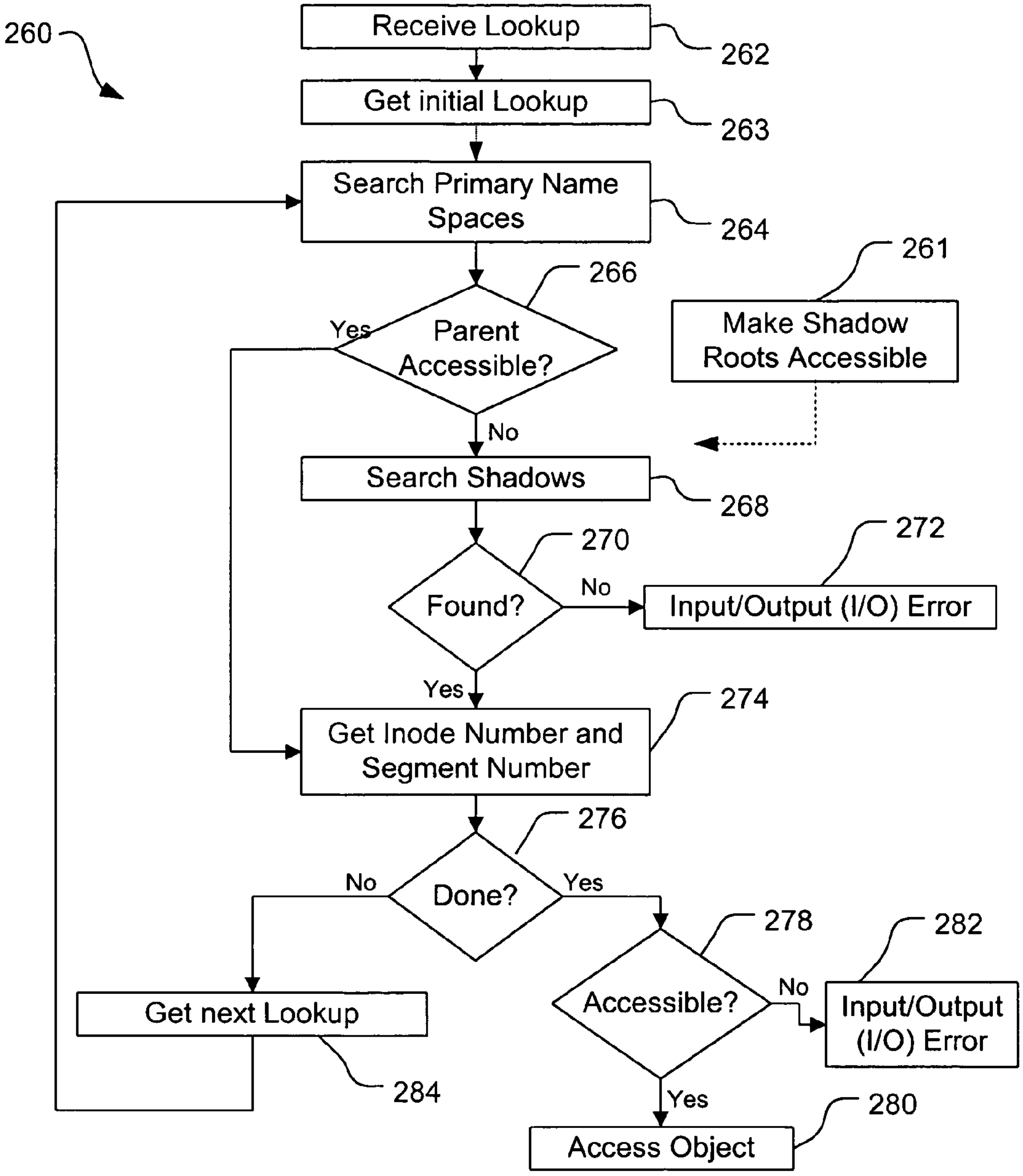
FIG. 11 is a block flow diagram of a process of using a shadow tree to access a distributed file system object where a directory in the object's ancestry is inaccessible.

In operation, referring to FIG. 11, with further reference to FIGS. 5-6, a process 260 includes the stages shown using the shadow tree 40 to access a file system object (file or directory) where a segment 20 storing at least one directory in a chain of the object is inaccessible. The process 260 is exemplary only and not limiting. The process 260 can be altered, e.g., by having stages added, removed, or rearranged. For exemplary purposes, it is assumed that the file system is a Unix®-based system, the client file 42 of the configuration shown in FIG. 6 is to be accessed by the server $16_3$ using the shadow tree 40, and that the segment $20_{2,1}$ is inaccessible.

At stage 261, the shadow trees are made visible to the servers 16. The shadows can preferably be made visible at any time in response to detection that a segment 20 is inaccessible, e.g., by a centralized device such as the administrator 22. This determination and change to visibility/accessibility can be run in the background, e.g., periodically or asynchronously with respect to operations performed by the servers 16. The segment inaccessibility determination may also be made by the server 16 that controls the segment 20 that becomes inaccessible, or by another server 16, and may be made in conjunction with operations performed by the servers 16, e.g., attempting to access the inaccessible segment 20. The inaccessible segment 20 may be the result of an entire server 16 becoming inoperable, at least with respect to providing access to the segments 20 controlled by that server 16.

At stage 262, the server $16_3$ receives a lookup request. For example, the ultimate aim may be to access the file 42, with the full inquiry being for /Da/Db/Dc/Dd/Fe. At stage 263, the initial part of the lookup request is extracted, resulting in a lookup for the root directory 51 in a Unix®-based system, so the lookup request will be to "lookup /Da." The root directory 51 has a known Inode number and segment location. For lookups after the initial lookup, the Inode number and segment number will be provided, e.g., as found and/or determined by the searching server $16_3$.

At stage 264, the server $16_3$ searches in the primary name spaces of the segments 20 for the Inode number corresponding to the lookup request. Preferably, the server $16_3$ begins with the segments 20 that the server $16_3$ controls, but this is not required. For the initial lookup of the root directory 51, the server $16_3$ searches for the known Inode number, here 2, on the segment 20 known to control the Inode of the root directory, here the segment $20_{1,1}$. For future searches, the server $16_3$ searches for the Inode number of the segment 20 indicated by a previously-found directory.

At stage 266, the server $16_3$ determines whether the segment 20 known to control the object being looked up is accessible. If the segment 20 is accessible, then the process 260 proceeds to stage 274 described below. If the segment 20 is not accessible, then the process 260 proceeds to stage 268 to search shadow trees for the object.

At stage 268, the server $16_3$ searches accessible shadow trees for a shadow entry corresponding to the currently-sought-after object. The server $16_3$ searches the shadow trees for the Inode number of the current object under the segment root corresponding to the segment number associated with the Inode number. Preferably, the server $16_3$ searches the shadow trees on the segments 20 that the server $16_3$ controls, then, if at all, searches the segments 20 controlled by other servers 16. An order/sequence of other servers 16 and/or other segments 20 on the other servers 16 that the server $16_3$ searches/queries can take a variety of forms. For example, master/servant principals may guide the search such that the searching server's master is searched first, and other servers 16 that have the same master as the searching server 16 are searched next. If the searching server 16 has no master, then the searching server's servants are searched first. The search may be performed using a multicast technique (query sent to successive groups of servers), a broadcast technique (blanket inquiry sent to all servers), a near-neighbor technique where successively more distant neighbors to the searching server 16 are searched first (in accordance with a server topology such as a ring, star, mesh, tree, etc.), a token-pass technique where a search token is passed from server 16 to server 16. Other techniques are also possible.

At stage 270, an inquiry is made as to whether a shadow entry satisfying the criteria of being associated with the desired Inode number (e.g., with that number as a label/name of the entry) and being associated with the segment root 90 of the segment number associated with the desired Inode number has been found. If an appropriate shadow entry has been found, then the process 260 proceeds to stage 274 described below. If no appropriate shadow entry has been found, then the process 260 proceeds to stage 272 where an input/output error is indicated (e.g., by a message on a computer screen of a requesting entity).

At stage 274, the server $16_3$ confirms that it has found the currently-sought-after object and obtains its Inode and segment numbers. The server $16_3$ analyzes the found directory or shadow entry to obtain the Inode number of the currently-sought-after object. The server $16_3$ also analyzes the found directory or shadow entry for the segment number for the obtained Inode number, or determines (e.g., by applying an algorithm or searching a lookup table, etc.) the corresponding segment number.

At stage 276, an inquiry is made as to whether the desired object has been completely found. If there is a next portion of the address, then the process 260 proceeds to stage 284 described below. If there is no next portion of the address, then the searching is completed and the process 260 proceeds to stage 278.

At stage 278, an inquiry is made as to whether the desired object is accessible. If the desired object is accessible, then the process 260 proceeds to stage 280 where the desired object is accessed and desired operations (e.g., read, write) are performed. If the desired object is not accessible, then the process 260 proceeds to stage 282 where an error is indicated (e.g., on a computer screen of a requesting entity).

At stage 284, the server $\mathbf{16}_3$ extracts the next portion of the address from the original lookup request. The process returns to stage 264 for the server $\mathbf{16}_3$ to search for the new currently-desired object according to the new, more complete, address.

For illustrative purposes, the example of a Unix®-based system, with the client file 42 of the configuration shown in FIG. 6 being the object to be accessed by the server $\mathbf{16}_3$ using the shadow tree 40, and with the segment $\mathbf{20}_{2,1}$ being inaccessible will now be described. On the first pass through stage 263, in response to receiving the "lookup /Da" request, the server $\mathbf{16}_3$ searches the segment $\mathbf{20}_{1,1}$ for the root directory 51. At stage 266, the server $\mathbf{16}_3$ confirms that it can access the root directory 51 and the process 260 proceeds to stage 274 where the server $\mathbf{16}_1$ provides the Inode and Segment numbers for Da, here 63 and 3 respectively. At stage 276, it is determined that the process 260 is not done, as Da is not the final desired object Fe. Thus, the process 260 proceeds to stage 284 where the server $\mathbf{16}_3$ determines Db to be the next object to be found. On the next pass through the process 260, the directory Da is found in the primary name space of the segment $\mathbf{20}_{3,1}$, and the Inode and segment number for the directory Db, here 8 and 2 respectively, are determined.

When the server $\mathbf{16}_3$ tries to locate the directory Db on the third pass through the process 260, the server $\mathbf{16}_3$ will invoke the shadow tree 40. At stage 266, the server $\mathbf{16}_3$ is unable to access the segment $\mathbf{20}_{2,1}$ which contains Db, and the process 260 proceeds to stage 268 for searching of the shadow trees. At stage 261, the shadow tree 40 is made visible to the server $\mathbf{16}_3$, e.g., in response to the segment $\mathbf{20}_{2,1}$ being inaccessible, or in response to the server $\mathbf{16}_3$ indicating that the segment $\mathbf{20}_{2,1}$ is inaccessible, etc., so that the server $\mathbf{16}_3$ can search the shadow tree 40. The server $\mathbf{16}_3$ knows the Inode number and segment number of the directory Db from stage 274 of the previous pass through the process 260 and at stage 268 searches the shadow tree 40 under the segment root $\mathbf{90}_2$ for a shadow entry labeled 8, corresponding to the Inode number of 8 for the directory Db. The server $\mathbf{16}_3$ finds such an entry, namely the shadow entry 44, and thus the inquiry at stage 270 is positive and the process proceeds to stage 274 to get the Inode and Segment numbers for the directory Dc.

On the fourth and fifth passes through the process 260, the server $\mathbf{16}_3$ finds the shadow entries 46 and 48 for the directory Dd and the Inode for the file Fe. The fourth pass proceeds similar to the third pass, but with the results of finding the shadow entry 46. On the fifth pass, the server $\mathbf{16}_3$ finds the Inode for the file Fe in the primary name space of the segment $\mathbf{20}_{3,1}$. Further, at stage 276, the inquiry as to whether the search is done is positive, and the process 260 proceeds to stage 278 where it is determined that the file Fe is accessible. The process 260 proceeds to stage 280 where the file Fe is accessed for appropriate processing (e.g., reading, writing).

The process 260 can be modified in accordance with shadow tree configurations and techniques other than those shown in FIG. 6. For the shadow tree configuration shown in FIG. 8, the third pass of the process 260 would search under the shadow root $\mathbf{90}_2$ for any .path entries with the name Dc in it with its immediately preceding component had an Inode number of 8. This search would result in finding the entry 32 and returning the Inode number of Dc as 22. The fourth and fifth passes would similarly resolve the Inode numbers for Dd and Fe and the process 260 would complete as before.

For the shadow tree configuration of FIG. 9, it is not possible to resolve the full lookup of /Da/Db/Dc/Dd/Fe if Segment $\mathbf{20}_{2,1}$ is inaccessible, due to the fact that shadow entries for Db, Dc and Dd are not maintained in this configuration on Segment $\mathbf{20}_{3,1}$. Instead, this configuration may be used to access Fe by traversing the shadow tree of Segment $\mathbf{20}_{3,1}$ using the traditional file system traversal method. The traversal starts at the shadow root 92, proceeds to segment root $\mathbf{90}_2$, then to shadow entry 48 and finally to the desired object Fe.

Another application of shadow directory structures is in conducting maintenance operations such as consistency checking, repairs, and upgrades. Shadow trees may be used to conduct maintenance operations on only a portion of the file system. For exemplary purposes, the following discussion uses file system consistency checking as the maintenance operation, but other maintenance operations are within the scope of the invention. Additionally, the following example assumes a Unix® system, but the technique described is applicable to other platforms.

While previous file systems have allowed file system consistency checks, referred to commonly as "fsck" (pronounced "fisk"), to be performed with the entire file system being taken out of service prior to execution of the fsck operation, the invention allows for fsck to be performed on less than the entire file system at a given time. Traditional file systems have used monolithic architectures in which the entire file system is taken offline to perform a fsck. Using shadow trees, consistency checking of a segmented distributed file system can be performed on less than the entire file system (i.e., a partial fsck), e.g., several of the segments 20 in parallel, or one segment 20 at a time. If only one segment 20 is being checked, then the segment 20 being checked for consistency is preferably the only one taken offline while the consistency check operation is executed on that segment 20. Other segments 20 may remain online and accessible during this operation.

In general, a fsck operation consists of two logical phases:

1. file space checking—in this phase, (preferably all) low-level structures used for storing file system objects are checked for consistency—for example, block allocation maps and summaries, inode allocation maps, block pointers within inodes, etc.
2. name space checking—in this phase, the directory tree structure of the file system is checked for consistency, by traversing the directory tree (preferably exhaustively traversing the entire directory tree) of the file system starting from the root directory, and validating elements (preferably every element) of the tree.

With the segmented file system described above, file-space operations are contained within each segment 20 and only name space operations extend across segment boundaries. The file-space checking portion of a fsck can be performed on an individual segment 20 of this file system without affecting any other segment 20. The name-space checking phase uses the shadow tree to address the fact that there may be arbitrary name space dependencies (linkages) between segments 20—i.e. a given segment 20 may have any number of name space links to any number of other segments 20. The shadow tree may be used to check for consistency of these name space linkages without performing an exhaustive traversal of the entire name space with all segments 20 taken offline. The shadow tree mechanism provides information to build a list of external references (preferably a complete list of all external references) to be checked for a given segment 20. With this list, a "targeted" scan can be performed of remote segments 20, checking (preferably only) those file system objects on remote segments 20 that are related to the external references. Segments 20 that are being checked for file space consistency are put in an un-modifiable, "frozen" state. Other (remote) segments 20 are preferably not taken offline during this process thus allowing these segments 20 to be accessed and modified by other agents such as a user-application accessing a remote segment 20.

Figure 12:
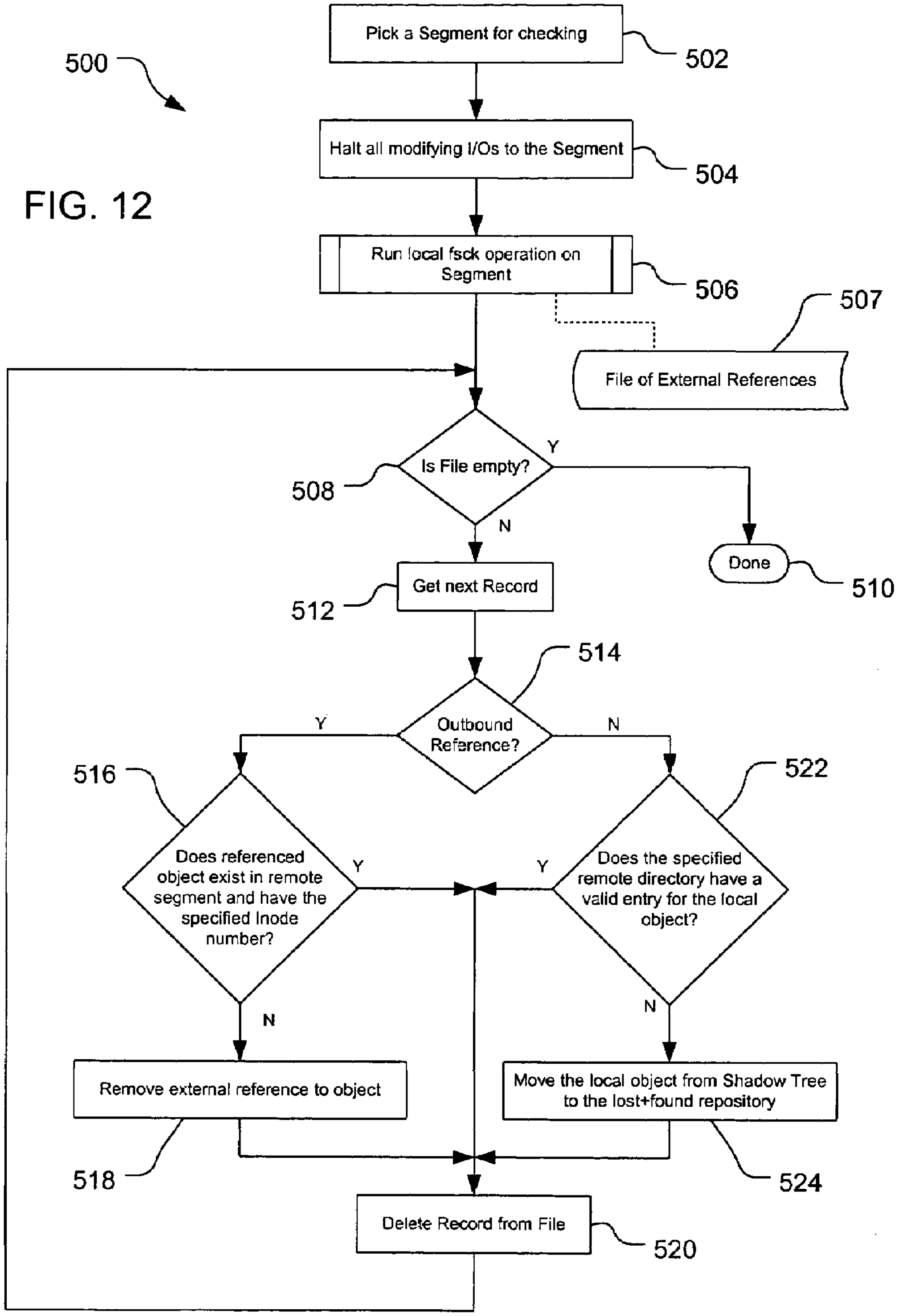
FIG. 12 is a block flow diagram of a process of performing file system consistency checking in a distributed segmented file system using a shadow directory structure.

In operation, referring to FIG. 12, with further reference to FIGS. 5-6, a process 500 for performing a partial fsck includes the stages shown. The process 500, however, is exemplary only and not limiting. The process 500 may be altered, e.g., by having stages added, removed, or rearranged. The following discussion describes the process 500 both generally, and with reference to FIG. 6 for an example (the Example) of an outbound object, the directory Da 52, and an inbound shadow entry 48 associated with a directory Dd 58 and a file Fe 42. The Example is not limiting of the invention, and is provided for illustrative purposes only.

At stage 502, a segment 20 is chosen by the administrator 22, the file system software itself, a user, or other process, for checking. This selection may be done in a variety of manners and/or for a variety of reasons, e.g., an indication of file system inconsistencies, randomly, sequentially by segment number, by file server, by expected or current use (e.g., with less-used segments being picked first), by time elapsed since last check (scheduled maintenance), combinations of these, etc. For the Example, the segment $\mathbf{20}_{3,1}$ is selected for analysis.

At stage 504, the chosen segment 20 is "frozen." Modifying input/output requests are inhibited from reaching the segment 20 such that write access to the chosen segment 20 is denied. This helps prevent modifications to the chosen segment 20 while consistency checking of the segment 20 is ongoing, which could undermine and even invalidate results of the consistency checking.

Figure 13:
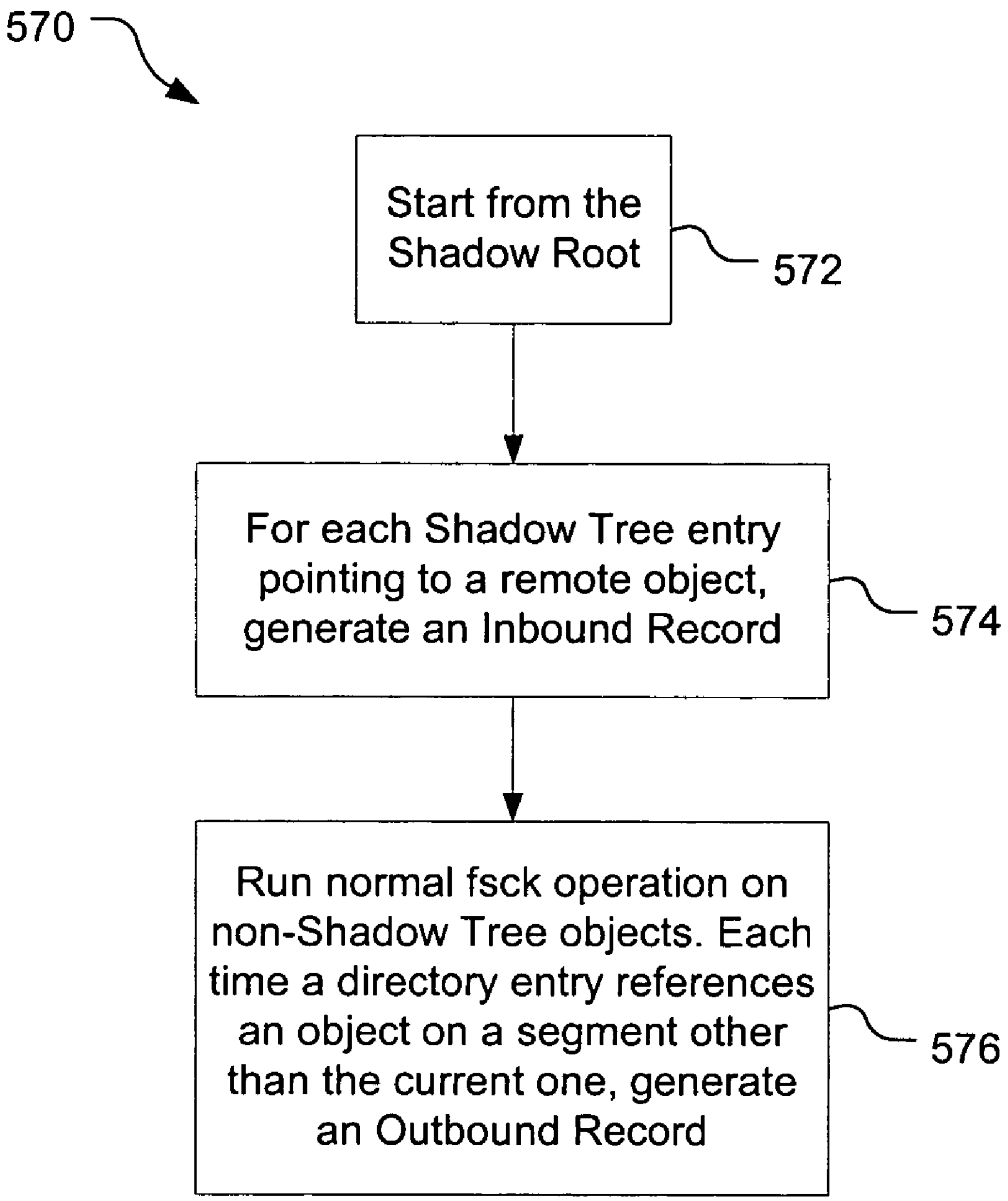
FIG. 13 is block flow diagram of a process of performing local file system consistency checking operations.

At stage 506, a local fsck operation is run on the selected segment 20. Here, low-level structures for storing file system objects are checked for consistency, e.g., block allocation maps and summaries, inode allocation maps, block pointers within inodes, etc. At this stage, records of external references are produced and stored, e.g., in a file 507 of such references, although the records may be stored in other formats. Referring to FIG. 13, the stage 506 includes a process 550 including the stages shown. The process 570, however, is exemplary only and not limiting. The process 570 may be altered, e.g., by having stages added, removed, or rearranged, e.g., by having stage 576 performed before stages 572 and 574.

At stage 572, the server 16 analyzes the shadow tree structure of a selected segment 20 and produces inbound records. The server 16 starts from the shadow root and proceeds to other shadow entries in the tree and records appropriate information. For the Example, the server 16 begins with the root 92 and proceeds to analyze the entries 90, 41, 44, 46, 48 of the shadow tree 40.

Figure 14:
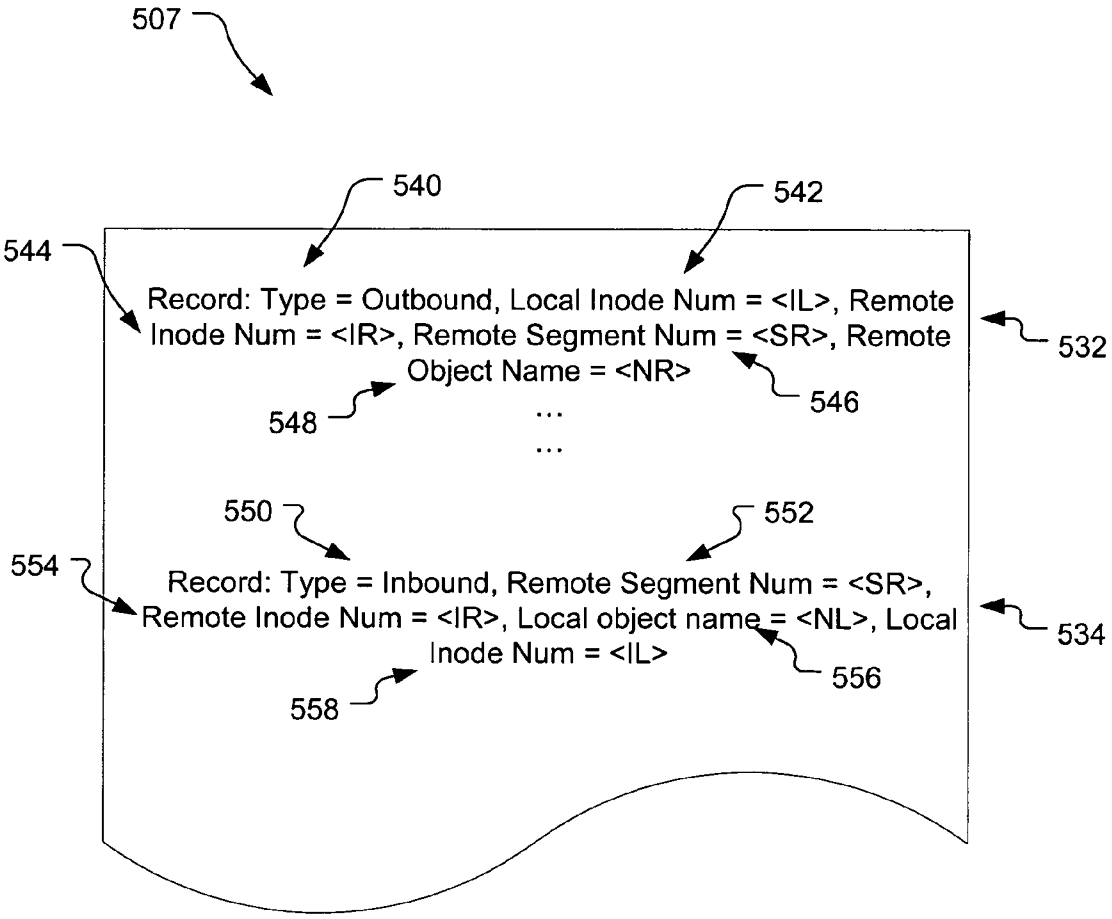
FIG. 14 is a simplified, generic portion of a file produced during the process shown in FIG. 12 including inbound and outbound records.

At stage 574, for each shadow tree entry pointing to a remote object logically outside of the segment 20 containing the analyzed shadow tree entry, the server 16 produces an inbound record 534. As shown in FIG. 14, the inbound record 534 includes a type indicator 550, a remote segment number indicator 552, a remote inode number indicator 554, a local object name indicator 556, and a local inode number indicator 558. In the Example, for the inbound object Dd 58 that points to file Fe 42, the remote segment number indicator 552 would indicate 2, the remote inode number indicator 554 would indicate 49, the local object name indicator 556 would indicate Fe, and the local inode number indicator 558 would indicate 71.

At stage 576, the server 16 runs a normal fsck operation on non-shadow tree objects. For objects in the segment 20 under review that point to objects external to the segment 20 under review, outbound records are produced. In the Example, the directory Da 52 in segment $\mathbf{20}_{3,1}$ points to an external object, here the directory Db 54 in segment $\mathbf{20}_{2,1}$. As shown in FIG. 14, an outbound record 532 includes a type indicator 540, a local inode number indicator 542, a remote inode number indicator 544, a remote segment number indicator 546, and a remote object name indicator 548. In the Example, for the outbound object 52, the local inode number indicator 542 would indicate 63, the remote inode number indicator 544 would indicate 8, the remote segment number indicator 546 would indicate 2, and the remote object name indicator would indicate Db.

Returning to FIG. 12, at stage 508, an inquiry is made as to whether the file 507 is empty. If so, then the process 500 proceeds to stage 510, where the process 500 ends (and may be reinitiated for the same or a different segment 20). Otherwise, if the file is not empty, there being records in the file 507, then the process 500 proceeds to stage 512, where a record, e.g., the sequentially next record, in the file is selected and read.

At stage 514, the server 16 determines whether the currently-selected record is an outbound reference or an inbound reference. The server 16 reads the record type, determining that the record is an outbound record if so indicated by the record type 540 and determining that the record is an inbound record if so indicated by the record type 550. If the reference is an inbound reference, then the process 500 proceeds to stages 522 and 524. If the reference is an outbound reference, then the process 500 proceeds to stages 516 and 518.

At stage 516, the server 16 determines whether the outbound referenced object exists in the remote segment referenced by the record 532. The server 16 reads the remote segment number indicator 546 and the remote inode number indicator 544 and queries the corresponding file server 16 for information regarding the indicated segment number and the indicated inode number. The server 16 determines from the information provided by the queried server 16 if the object referenced by the record 532 exists in the referenced segment 20 with the referenced inode number. In the Example, the administrator queries the server $\mathbf{16}_2$ as to whether the segment $\mathbf{20}_{2,1}$ contains the directory Db at inode number 8. If the object does exist at that segment 20 and with that inode number (and satisfies other checks, if any, to establish the validity of the inode itself, such as a non-zero link count), then the process 500 proceeds to stage 520 where the current record 532 is removed from the file 507. In the Example, the object exists where expected, and the current record is deleted. If the object does not exist in the specified segment 20 with the specified inode number, then the process 500 proceeds to stage 518 where the server 16 cleans up the directory entry by causing the server 16 controlling the segment containing the outbound pointer object corresponding to the currently-selected file record 532 to remove at least the outbound pointer, and possibly the entire object.

At stage 522, the server 16 determines whether the specified remote directory has a valid entry for the local object (the object in the fsck-ed segment 20 resulting in the currently-selected record). The server 16 reads the remote segment number indicator 552, the remote inode number indicator 554, the local object name indicator 556 and the local inode number indicator 558 of the currently-selected inbound record 534. The server 16 queries the corresponding file server 16 for information regarding the indicated segment number and the indicated inode number to verify whether the corresponding object includes a pointer to the object name and inode number read from the indicators 556, 558. In the Example, the administrator 22 queries the server $16_2$ as to whether the segment $20_{2,1}$ contains a pointer to Fe at inode number 71 in a directory Dd at inode number 49. If the corresponding object does include such a pointer (and other checks, if any, to establish the validity of the pointer, such as a valid link count), then the process 500 proceeds to stage 520 where the currently-selected record 534 is removed from the file 507, as is the case in the Example. Otherwise, if a valid entry for the local object does not exist for the specified segment 20 and inode number, then the process 500 proceeds to stage 524.

At stage 524, the shadow tree entry upon which the currently-selected record 534 is based is moved into a lost and found repository. The server 16 moves the shadow tree entry into the lost and found repository for the file system where it is left for the user to decide on a subsequent action regarding the shadow tree entry such as permanently deleting it from the file system.

While the description above regarding fsck operations focused on performing such operations on a single segment 20 at a time, such operations may be performed on multiple segments 20 in parallel. Thus, multiple segments 20 may be selected and fsck operations performed on them, although such operations will not necessarily be performed simultaneously, especially if the operations are performed for multiple segments 20 by a single processor. Fsck operations may, however, be performed on multiple segments simultaneously, e.g., with multiple processors each performing fsck operations on at least one segment 20.

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. Further, while Inodes numbers were used frequently above, this was for exemplary purposes and other forms of FIDs (e.g., FCBs, file system object names etc.) would be acceptable.

Other embodiments are within the scope and spirit of the invention and the appended claims.

What is claimed is:

1. A file server comprising:

a memory interface configured to communicate with a memory storing at least one segment of a distributed, segmented single file system implemented by an association of devices including a plurality of file servers that control metadata of separate segments of the file system; and a processor coupled to the memory interface and configured to:

identify a file residing on a first segment in the distributed file system and directly pointed to by a first remote ancestor directory that resides on a second segment separate from the first segment; and store a first shadow tree entry in a selected segment other than the second segment, the selected segment being controlled by one of the plurality of servers, and the first shadow tree entry providing a pointer to the identified file and being disposed in a shadow tree;

wherein the first shadow tree entry provides an alternative to the first remote ancestor directory to access the identified file in the distributed file system.

2. The file server of claim 1 wherein the processor is configured to cause the memory to store the first shadow tree entry in response to a request to produce the identified file.

3. The file server of claim 2 wherein the processor is configured to at least one of analyze a prefix provided by the request to determine the first shadow tree entry and analyze stored D_entries associated with the request to determine the first shadow tree entry.

4. The file server of claim 1 wherein the first shadow tree entry includes a first indication that the first shadow tree entry is associated with the first remote ancestor directory, and wherein the processor is further configured to store a second shadow tree entry that provides a pointer to the first remote ancestor directory, wherein the second shadow tree entry includes a second indication that the second shadow tree entry is associated with a second remote ancestor directory that includes a pointer to the first remote ancestor directory.

5. The file server of claim 4 wherein the first and second shadow tree entries are associated with first and second segment roots indicative of the segment on which the first and second remote ancestor directories reside.

6. The file server of claim 4 wherein the first and second shadow tree entries are associated with each other as at least part of an ancestral chain from a root directory to the identified file.

7. The file server of claim 1 wherein the processor is further configured to store, in at least one shadow tree, further shadow tree entries that provide respective pointers to further remote directories that form an ancestral chain of directories each with a pointer to a directory immediately after itself in the chain, the processor being configured to store the further shadow tree entries for each preceding directory in the chain up to a directory in the chain that is disposed in the first segment.

8. The file server of claim 1 wherein the processor is configured to store the first shadow tree entry on the first segment.

9. The file server of claim 1 wherein the selected segment is the first segment.

10. The file server of claim 1 wherein the shadow tree includes a sequence of directories through which the identified file can be accessed.

11. The file server of claim 1 wherein the processor is configured to store the first shadow tree entry such that a shadow path including the first shadow tree entry is of a deterministic length.

12. The file server of claim 11 wherein the deterministic length is two from and including the first shadow tree entry and a shadow root associated with the second segment.

13. The file server of claim 1 wherein the processor is configured to store shadow tree entries corresponding only to parent directories whose children file system entities are stored on remote segments, regardless of whether the parent directories' grandchildren file system entities are stored on remote segments.

14. A computer program product residing on a memory comprising computer-readable instructions for causing a computer to:

identify a file residing on a first segment in a distributed, segmented single file system implemented by an association of devices including a plurality of file servers that control metadata of separate segments of the file system, the identified file being directly pointed to by a first remote ancestor directory that resides on a second segment separate from the first segment; and store a first shadow tree entry in a selected segment other than the second segment, the selected segment being controlled by one of the plurality of servers, the first shadow tree entry providing a pointer to the identified file and being disposed in a shadow tree;

wherein the first shadow tree entry provides an alternative to the first remote ancestor directory to access the identified file in the distributed file system.

15. The computer program product of claim 14 further comprising at least one instruction for causing the computer to store the first shadow tree entry in response to a request to produce the identified file.

16. The computer program product of claim 15 further comprising at least one of instructions to cause the computer to analyze a prefix provided by the request to determine the first shadow tree entry and instructions to cause the computer to analyze stored D_entries associated with the request to determine the first shadow tree entry.

17. The computer program product of claim 14 wherein the first shadow tree entry includes a first indication that the first shadow tree entry is associated with the first remote ancestor directory, and wherein the computer program product further comprises instructions for causing the computer to store a second shadow tree entry that provides a pointer to the first remote ancestor directory, wherein the second shadow tree entry includes a second indication that the second shadow tree entry is associated with a second remote ancestor directory that includes a pointer to the first remote ancestor directory.

18. The computer program product of claim 17 wherein the first and second shadow tree entries are associated with first and second segment roots indicative of the segment on which the first and second remote ancestor directories reside.

19. The computer program product of claim 17 wherein the first and second shadow tree entries are associated with each other as at least part of an ancestral chain from a root directory to the identified file.

20. The computer program product of claim 14 further comprising instructions for causing the computer to:

store further shadow tree entries that provide respective pointers to further remote directories that form an ancestral chain of directories each with a pointer to a directory immediately after itself in the chain; and store the further shadow tree entries for each preceding directory in the chain up to a directory in the chain that is disposed in the first segment.

21. The computer program product of claim 14 wherein the instructions for causing the computer to store the first shadow tree entry are for causing the computer to store the first shadow tree entry on the first segment.

22. The computer program product of claim 14 wherein the selected segment is the first segment.

23. The computer program product of claim 14 wherein the shadow tree includes a sequence of directories through which the identified file can be accessed.

24. The computer program product of claim 14 wherein the instructions for causing the computer to store the first shadow entry cause the computer to store the first shadow tree entry such that a shadow path including the first shadow tree entry is of a deterministic length.

25. The computer program product of claim 24 wherein the deterministic length is two from and including the first shadows tree entry and a shadow root associated with the second segment.

26. The computer program product of claim 14 wherein the instructions for causing the computer to store the first shadow entry cause the computer to store shadow tree entries corresponding only to parent directories whose children file system entities are stored on remote segments, regardless of whether the parent directories' grandchildren file system entities are stored on remote segments.

27. The file server of claim 1 wherein the processor is further configured to:

identify a directory that resides on a third segment in the distributed file system and that is directly pointed to by a third remote ancestor directory that resides on a fourth segment separate from the third segment; and store a third shadow tree entry in a chosen segment other than the fourth segment, the chosen segment being controlled by one of the plurality of servers, and the third shadow tree entry providing a pointer to the identified directory;

wherein the third shadow tree entry provides an alternative to the third remote ancestor directory to access the identified directory in the distributed file system.

28. The computer program product of claim 14 further comprising instructions for causing the computer to:

identify a directory that resides on a third segment in the distributed file system and that is directly pointed to by a third remote ancestor directory that resides on a fourth segment separate from the third segment; and store a third shadow tree entry in a chosen segment other than the fourth segment, the chosen segment being controlled by one of the plurality of servers, and the third shadow tree entry providing a pointer to the identified directory;

wherein the third shadow tree entry provides an alternative to the third remote ancestor directory to access the identified directory in the distributed file system.

* * * * *